(12) United States Patent
Ishii

(10) Patent No.: US 11,141,929 B2
(45) Date of Patent: Oct. 12, 2021

(54) FIXING OBJECT, FIXATION ITEM, FIXING METHOD, AND ASSESSMENT METHOD

(71) Applicant: NEC Platforms, Ltd., Kawasaki (JP)

(72) Inventor: Hiroaki Ishii, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 320 days.

(21) Appl. No.: 15/770,261

(22) PCT Filed: Nov. 8, 2016

(86) PCT No.: PCT/JP2016/083067
§ 371 (c)(1),
(2) Date: Apr. 23, 2018

(87) PCT Pub. No.: WO2017/082241
PCT Pub. Date: May 18, 2017

(65) Prior Publication Data
US 2018/0311906 A1      Nov. 1, 2018

(30) Foreign Application Priority Data

Nov. 13, 2015   (JP) .............................. JP2015-222792

(51) Int. Cl.
*B29C 65/60*        (2006.01)
*B29C 65/14*        (2006.01)
(Continued)

(52) U.S. Cl.
CPC ............ *B29C 65/606* (2013.01); *B29C 65/14* (2013.01); *B29C 66/21* (2013.01);
(Continued)

(58) Field of Classification Search
CPC .. F16B 5/04; F16B 5/045; F16B 3/005; B23P 15/02; B23P 15/14; Y10T 29/49936;
(Continued)

(56) References Cited

U.S. PATENT DOCUMENTS 1,196,565 A * 8/1916 McDonald .............. F16B 35/06
411/184
1,511,822 A * 10/1924 Belcher .................... B21L 9/00
219/666
(Continued)

FOREIGN PATENT DOCUMENTS

| CN | 1041028 A | 4/1990 |
|---|---|---|
| CN | 1875194 A | 12/2006 |

(Continued)

OTHER PUBLICATIONS

Chinese Office Action for CN Application No. 201680066469.2 dated Dec. 24, 2019 with English Translation.
(Continued)

*Primary Examiner* — Flemming Saether

(57) ABSTRACT

To improve the visual probability of the quality of a fixed state of a fixing object fixed to a fixation item, the fixing object includes the supporting part having a hole and a groove formed in proximity to the hole. The groove is provided with a one-way open part, opened in a surface of the supporting part in which one exit of the hole is located and not opened in a surface of the supporting part in which the other exit of the hole is located, and the distance from the center of gravity of the hole to the portion of the groove that is farthest from the center of gravity of the hole is greater than the distance from the center of gravity to a side-surface portion in the hole that is closest to the groove without touching the groove.

4 Claims, 22 Drawing Sheets

(51) Int. Cl.
  *B29C 65/00* (2006.01)
  *F16B 3/00* (2006.01)
  *F16B 5/04* (2006.01)

(52) U.S. Cl.
  CPC ...... *B29C 66/30325* (2013.01); *B29C 66/322* (2013.01); *B29C 66/343* (2013.01); *B29C 66/474* (2013.01); *B29C 66/7392* (2013.01); *F16B 3/005* (2013.01); *F16B 5/045* (2013.01)

(58) Field of Classification Search
  CPC ............ Y10T 29/49943; B29C 65/606; B29C 66/30325; B29C 66/322
  USPC .................................................. 411/501, 504
  See application file for complete search history.

(56) References Cited

U.S. PATENT DOCUMENTS

| | | | | | |
|---|---|---|---|---|---|
| 2,306,389 | A | * | 12/1942 | Jorgensen | F16B 21/16 403/282 |
| 2,318,950 | A | * | 5/1943 | Larmour | B43K 25/022 24/11 F |
| 3,724,070 | A | * | 4/1973 | Dorion, Jr. | B26B 21/24 30/47 |
| 3,766,681 | A | * | 10/1973 | Mander | A01K 91/08 43/43.12 |
| 5,499,440 | A | * | 3/1996 | Satoh | B21K 25/00 29/512 |
| 7,055,785 | B1 | * | 6/2006 | Diggle, III | H02G 3/26 24/16 PB |
| 7,681,298 | B2 | * | 3/2010 | Babej | B23P 19/062 29/524.1 |
| 8,230,574 | B2 | * | 7/2012 | Schmidt | B21K 25/00 29/525.06 |
| 8,591,798 | B2 | * | 11/2013 | Oriel | B29C 66/81431 264/515 |
| 9,079,490 | B2 | * | 7/2015 | Lemoine | B29C 66/21 |
| 9,289,944 | B2 | * | 3/2016 | Verrat | B29C 65/08 |
| 9,388,838 | B2 | * | 7/2016 | Morris | B21J 15/02 |
| 9,447,840 | B2 | * | 9/2016 | Morris | F16F 15/08 |
| 9,611,751 | B1 | * | 4/2017 | Zagone | F01D 9/041 |
| 2002/0094414 | A1 | * | 7/2002 | Wagenblast | B32B 7/08 428/139 |
| 2007/0102094 | A1 | | 5/2007 | De Groot | |
| 2013/0195579 | A1 | | 8/2013 | Freis | |

FOREIGN PATENT DOCUMENTS

| | | |
|---|---|---|
| CN | 103240578 A | 8/2013 |
| GB | 560251 A | 3/1944 |
| JP | S61-183631 U | 11/1986 |
| JP | H06-043311 U | 6/1994 |
| JP | 2000-033442 A | 2/2000 |
| JP | 2000-076947 A | 3/2000 |
| JP | 3082162 U | 11/2001 |
| JP | 2006-212702 A | 8/2006 |
| JP | 2011-167900 A | 9/2011 |
| JP | 5460149 B2 | 4/2014 |

OTHER PUBLICATIONS

International Search Report for PCT Application No. PCT/JP2016/083067, dated Jan. 24, 2017.
English translation of Written opinion for PCT Application No. PCT/JP2016/083067.
Chinese Office Action for CN Application No. 201680066469.2 dated on May 7, 2019 with English Translation.
Japanese Office Action for JP Application No. 2017-550328 dated Jan. 5, 2021 with English Translation.

* cited by examiner

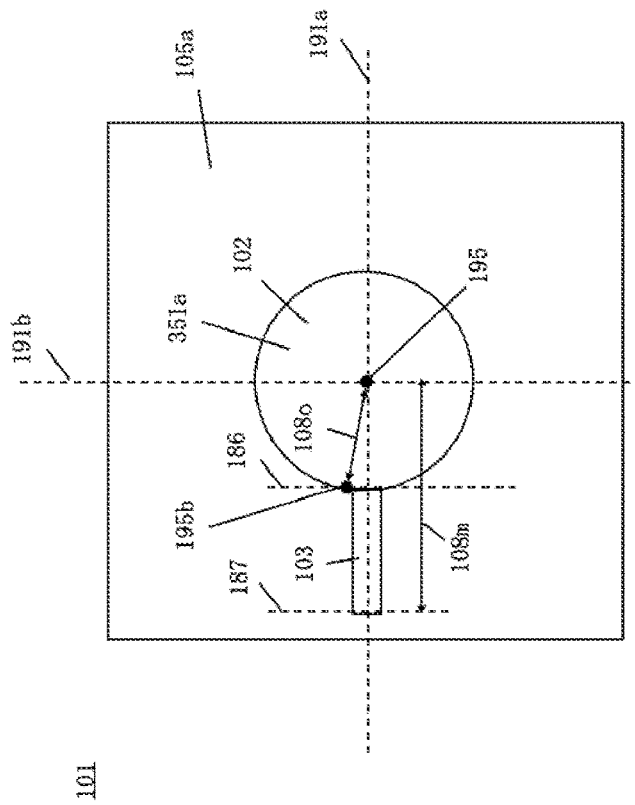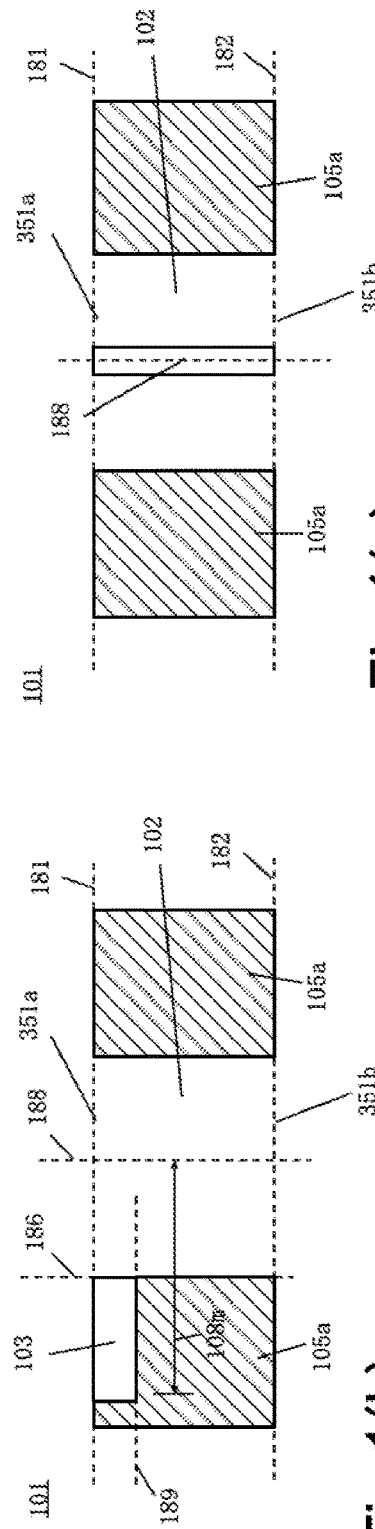
Fig.1(a)
Fig.1(b)
Fig.1(c)

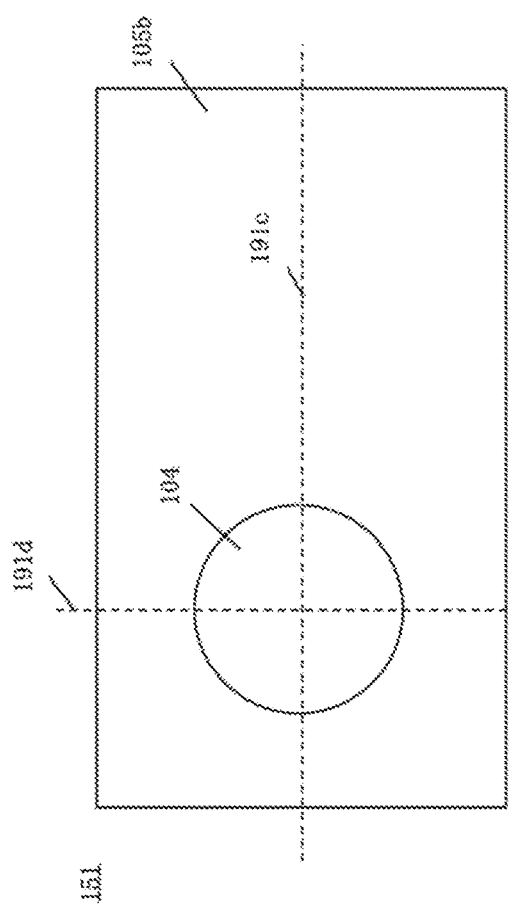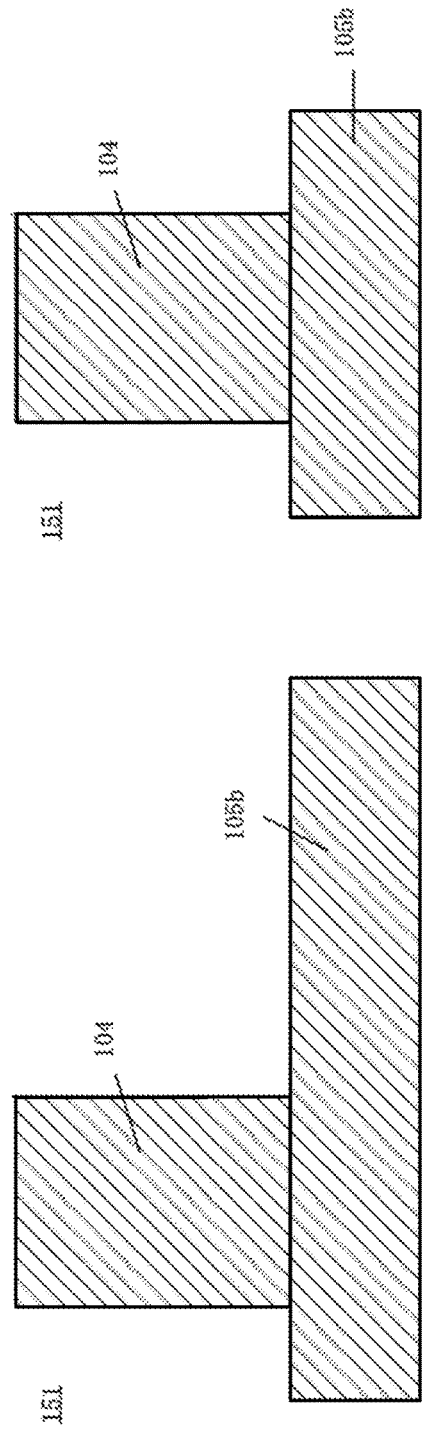
Fig.2(a)
Fig.2(b)
Fig.2(c)

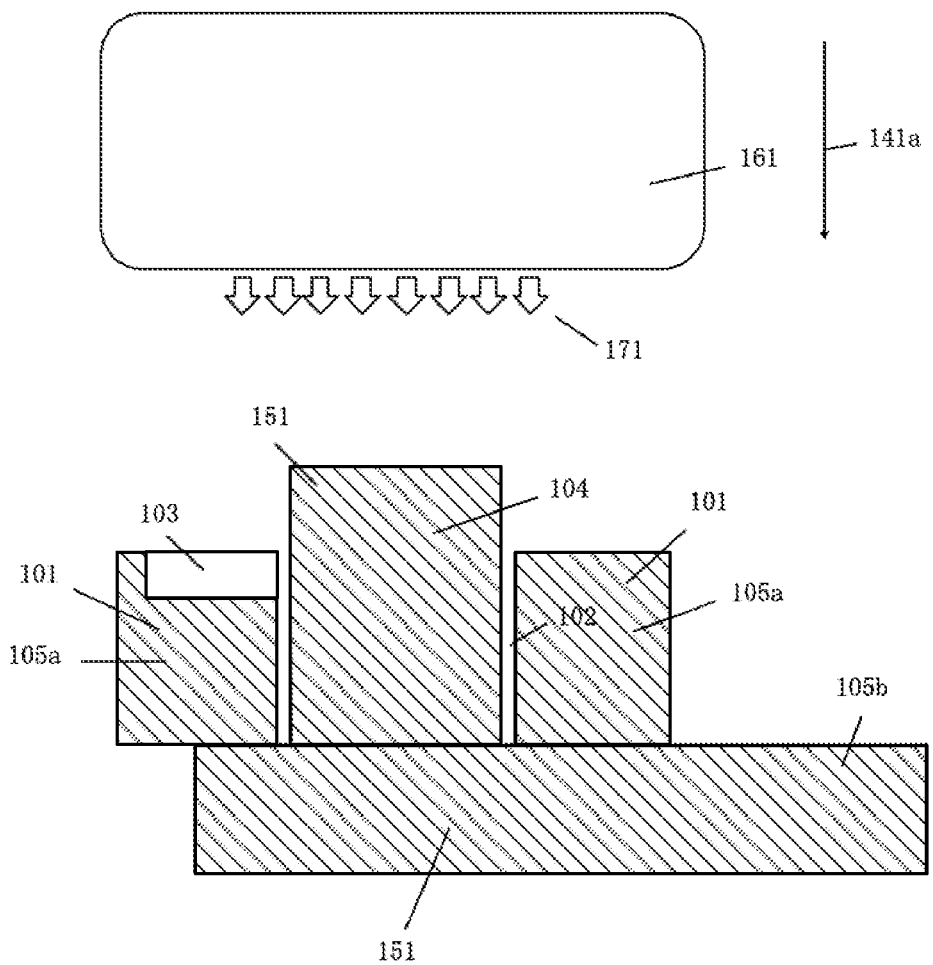

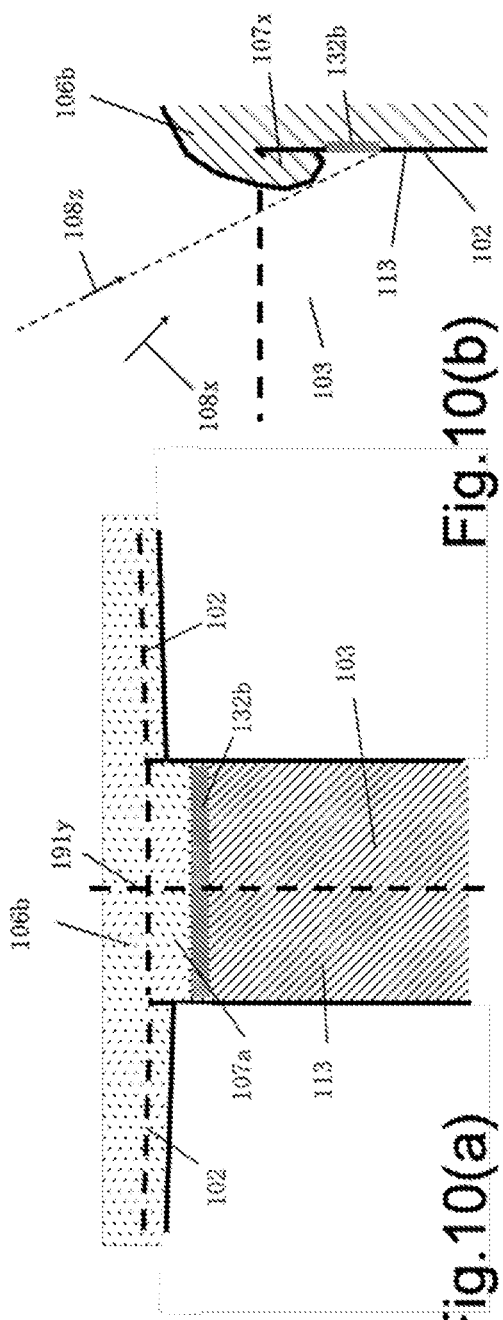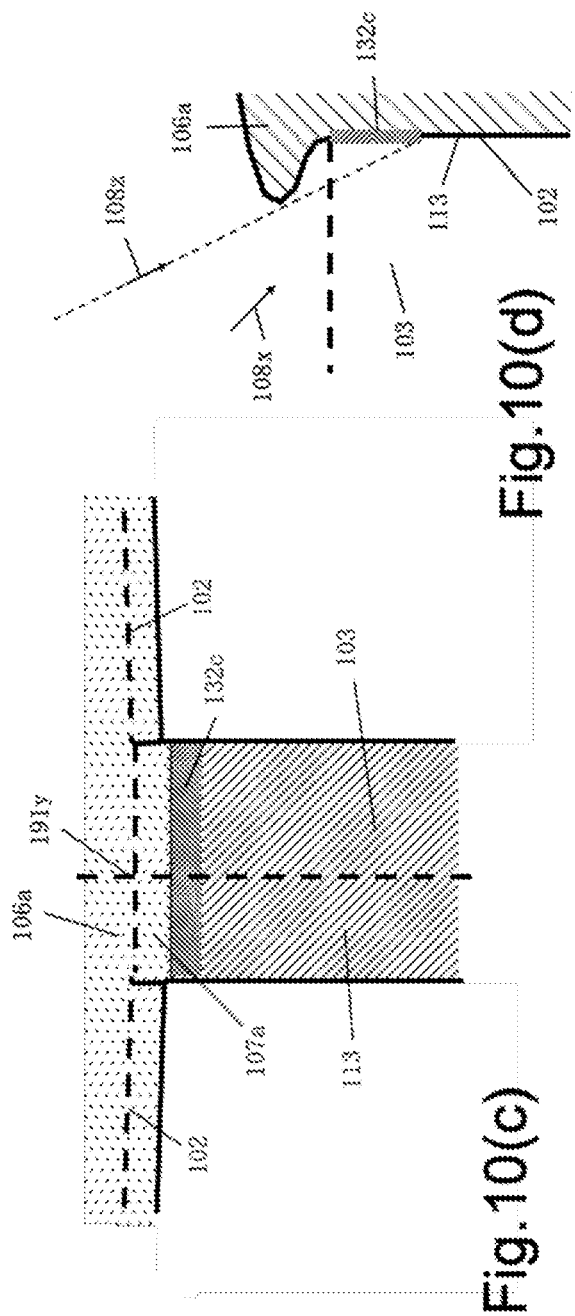

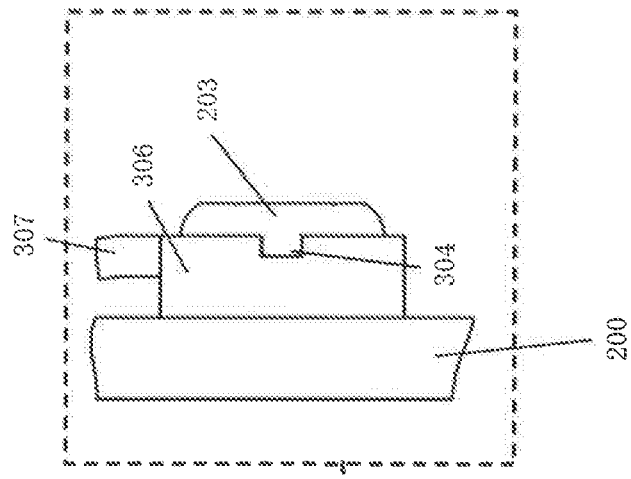
Fig.22(b)
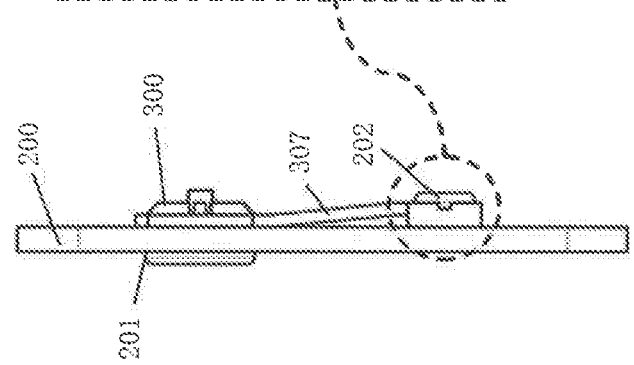
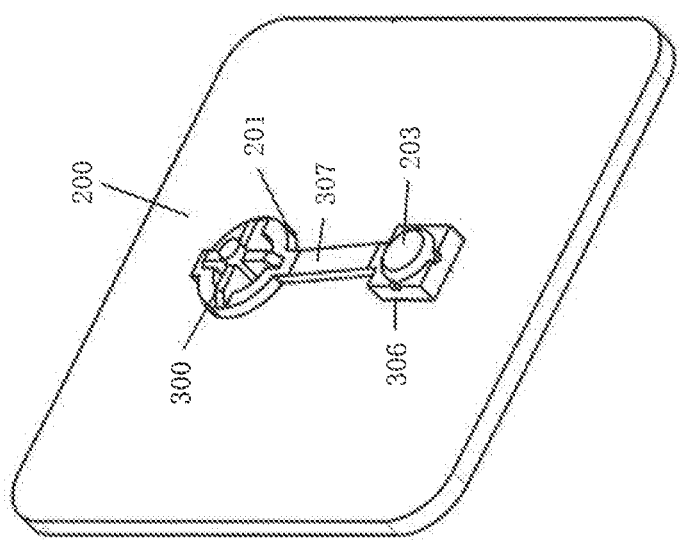
Fig.22(a)

FIXING OBJECT, FIXATION ITEM, FIXING METHOD, AND ASSESSMENT METHOD

This application is a National Stage Entry of PCT/JP2016/083067 filed on Nov. 8, 2016, which claims priority from Japanese Patent Application 2015-222792 filed on Nov. 13, 2015, the contents of all of which are incorporated herein by reference, in their entirety.

TECHNICAL FIELD

The present invention relates to a fixing object, a fixation item obtained by fixing the fixing object to a fixation item, a fixing method for fixing the fixing object to the fixation item, and an assessment method for making an assessment of a fixed state between the fixing object and the fixation item.

BACKGROUND ART

As a method for fixing a fixing object to a fixation item, a method for inserting a convex portion formed on the fixation item into a hole formed in the fixing object, and then deforming a tip of the convex portion is known.

PTL 1 discloses a welding structure in which a hole is formed in a certain object and mounted with a rib having a slit in an axial direction and a boss formed on another object is inserted into the hole, thereby welding a tip portion of the boss.

In association with the present invention, PTL 2 discloses a method in which a leg portion of a rivet-type contact point is inserted into a contact point mounting hole that is included in a base and provided with concave and convex portions at the whole circumference thereof, thereby caulking the leg portion into the contact point mounting hole.

In association with the present invention, PTL 3 discloses a mounting structure in which a caulking pin of a component to be mounted is inserted into a caulking through-hole of a mounting component, which is provided with a cut groove at a peripheral edge thereof, thereby caulking the caulking pin.

CITATION LIST

Patent Literature

[PTL 1] Japanese Unexamined Utility Model (Registration) Application Publication No. S61-183631
[PTL 2] Japanese Unexamined Patent Application Publication No. 2000-76947
[PTL 3] Japanese Unexamined Patent Application Publication No. 2000-33442

SUMMARY OF INVENTION

Technical Problem

The slit described in PTL 1 functions to prevent a misalignment of a boss inserted into a hole provided with the slit. In the method disclosed in PTL 1, the slit is formed in such a way as to reach a bottom portion of an item provided with the slit. When the slit is formed in such way as to reach the bottom portion, it is often difficult to visually check whether or not a tip portion of a welded boss is inserted into the slit after welding of the tip portion of the boss. A reason why it is often difficult to visually check the tip portion of the welded boss in such a case will be described in detail in [Example embodiments]. When the tip portion of the welded boss is not inserted into the slit after welding, a backlash due to a fixation failure is more likely to occur in a combination of a fixing object and a fixation item. In other words, in the method disclosed in PTL 1, a possibility of a backlash that may occur in the future due to a failure of a fixed state of a combination of a fixing object and a fixation item is overlooked in many cases.

The present invention has an object to provide a fixing object and the like capable of improving a probability that quality of a fixed state, in which a fixing object is fixed to a fixation item, is visually assessable.

Solution to Problem

The invented fixing object includes a supporting part including a hole and a groove formed in proximity to the hole. The groove has a one-way open part that is opened at a surface of the supporting part where one exit of the hole is present, and is not opened at a surface of the supporting part where another exit of the hole is present. A distance of a farthest portion of the groove from a center of gravity of the hole, from the center of gravity, is longer than a distance of a side-surface portion of the hole from the center of gravity, the side-surface portion being closest to the groove and being not in contact with the groove.

Advantageous Effects of Invention

According to a fixing object and the like of the present invention, a probability that quality of a fixed state, in which a fixing object is fixed to a fixation item, is visually assessable can be improved.

BRIEF DESCRIPTION OF DRAWINGS

FIG. 1 are conceptual diagrams each illustrating an example of a fixing object according to an example embodiment of the present invention;
FIG. 2 are conceptual diagrams each illustrating an example of a fixation item;
FIG. 3 is an image diagram illustrating a method for fixing the fixing object to the fixation item (No. 1);
FIG. 10 are image diagrams each illustrating an observed state in a portion in the vicinity of a boundary between a groove and a hole when a part of a deformed portion is formed within the groove.

FIG. 22 are diagrams each illustrating a combination of a fixing object including a supporting part provided with a horizontal groove and a vertical groove, and a fixation item, in which a welded boss is formed.

EXAMPLE EMBODIMENT

Configuration and Operation

Figure 4:
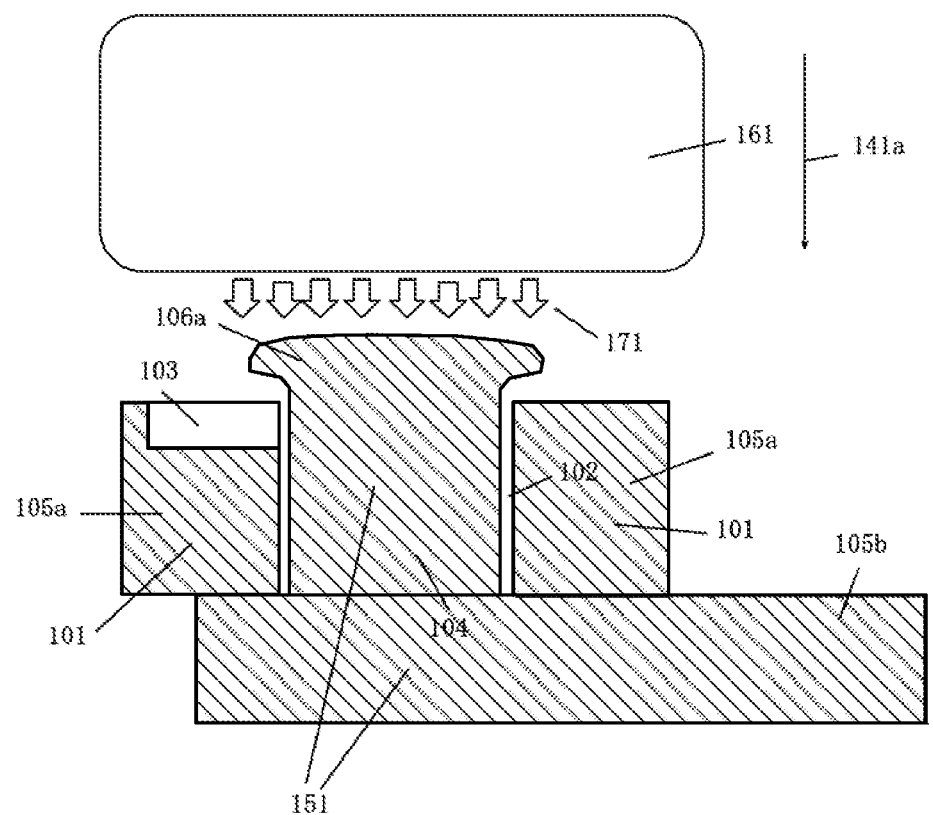
FIG. 4 is an image diagram illustrating a method for fixing the fixing object to the fixation item (No. 2)

FIG. 1 are conceptual diagrams each illustrating a fixing object 101 as an example of a fixing object according to this example embodiment. FIG. 1(a) is a top view of the fixing object 101. FIG. 1(b) is a cross section of the fixing object 101 assumed to be taken along a line 191a illustrated in FIG. 1(a). FIG. 1(c) is a cross section of the fixing object 101 assumed to be taken along a line 191b illustrated in FIG. 1(a).

The fixing object 101 includes a supporting part 105a.

The supporting part 105a is provided with holes 102 each having a shape hollowed with a cylindrical shape.

The supporting part 105a is also provided with a groove 103 having a rectangular shape as viewed from the top in a direction apart from the corresponding hole 102 from a boundary between the hole 102 and the groove 103 which is indicated by a line 186. The groove 103 is opened upward above the supporting part 105a at a height position of an upper surface of the supporting part 105a as indicated by a line 181. On the other hand, the groove 103 is not opened downward of the supporting part 105a at a height position of a lower surface of the supporting part 105a as indicated by a line 182. The groove 103 is opened toward the inside of the hole 102 from the boundary between the hole 102 and the groove 103 which is indicated by the line 186.

A point 195 illustrated in FIG. 1(a) represents a center of gravity of the hole 102 assuming a case where the fixing object 101 is viewed from the upper surface. A line 188 illustrated in FIGS. 1(b) and 1(c) represents the center of gravity of the hole 102 at the height position of each hole 102.

The groove 103 is opened at a surface (line 181) of the supporting part 105a where one exit 351a of the hole 102 is formed. The groove 103 is not opened at a surface (line 182) of the supporting part 105a where another exit 351b of the hole 102 is formed. In other words, the groove 103 includes a one-way open part that is a part having a bottom surface as indicated by a line 189. A distance (arrow 108m) from the center of gravity of the hole 102 in a portion (line 187) farthest from the center of gravity of the hole 102 in the groove 103 is longer than a distance (arrow 108o) from the center of gravity of a side-surface portion (point 195b) in the hole 102 that is closest to the groove 103 and is not in contact with the groove 103.

Note that, in the [Example embodiment], top and bottom indicate top and bottom positions viewed toward the drawings to be explained, and the height indicates a distance from a certain position in the bottom to another position in the top.

Next, an example of a fixation item, which is an object to which a fixing object 101 is fixed, will be described.

FIG. 2 are conceptual diagrams each illustrating a fixation item 151 as an example of a fixation item, which is an object to which the fixing object 101 is fixed. FIG. 2(a) is a top view of the fixation item 151, and FIG. 2(b) is a cross section of the fixation item 151 assumed to be taken along a line 191c illustrated in FIG. 2(a). FIG. 2(c) is a cross section of the fixation item 151 assumed to be taken along a line 191d illustrated in FIG. 2(a).

The fixation item 151 includes a convex portion 104 and a supporting part 105b.

The convex portion 104 is fixed onto the supporting part 105b as illustrated in FIG. 2.

The convex portion 104 includes a material that is heated to be softened and further dissolved. A typical example of the material included in the convex portion 104 is thermoplastic resin.

Next, a method for fixing the fixing object 101 to the fixation item 151 will be described.

Figure 5:
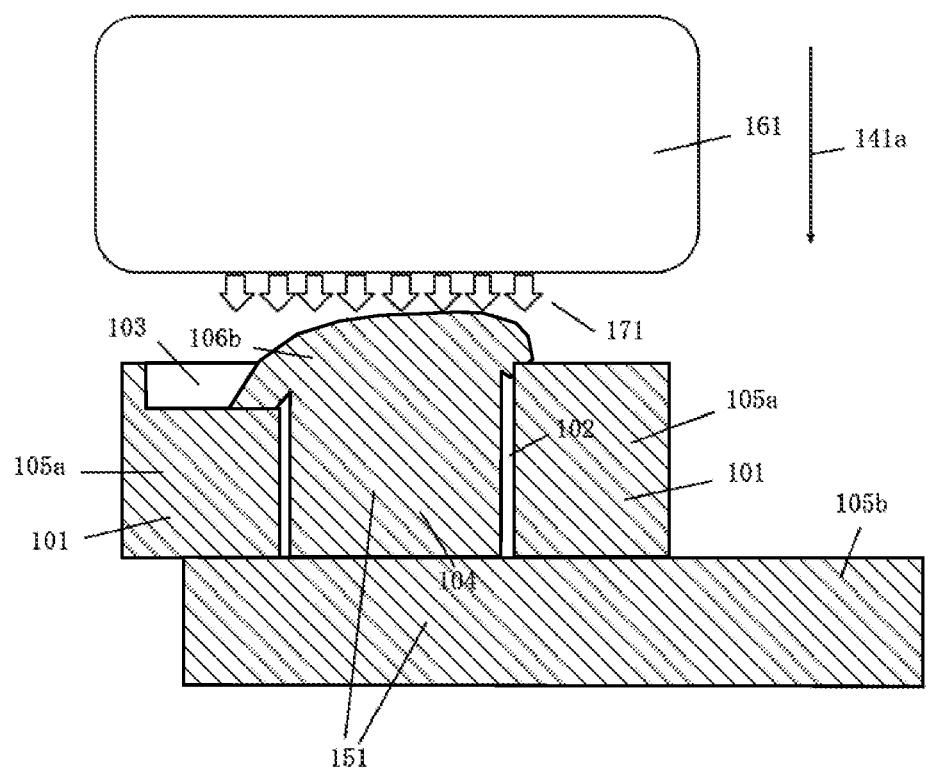
FIG. 5 is an image diagram illustrating a method for fixing the fixing object to the fixation item (No. 3)

FIGS. 3 to 5 are image diagrams each illustrating the method for fixing the fixing object 101 to the fixation item 151. FIGS. 3 to 5 illustrate sectional views corresponding to FIGS. 1(b) and 2(b).

First, as illustrated in FIG. 3, the convex portion 104 included in the fixation item 151 is inserted into the hole 102 included in the supporting part 105a included in the fixing object 101.

As illustrated in FIG. 3, the lower surface of the supporting part 105a is brought into contact with an upper surface of the supporting part 105b.

Next, a heater 161 that generates heat 171 downward is caused to descend in a direction indicated by an arrow 141a from above the convex portion 104. A temperature of an upper portion of the convex portion 104 is increased by the heat 171.

Then, the upper portion of the convex portion 104 is softened. The softened portion is deformed due to its own weight and surface tension, so that the deformed portion 106a is formed as illustrated in FIG. 4.

As the heater 161 is caused to further descend in the direction indicated by the arrow 141a, the softened portion of the upper portion of the convex portion 104 increases. The deformation of the softened portion due to its own weight and surface tension further increases.

As illustrated in FIG. 5, a deformed portion 106b is formed. A right-side portion of the deformed portion 106b as viewed toward FIG. 5 is in contact with the upper portion of the supporting part 105a. On the other hand, a left-side portion of the deformed portion 106b as viewed toward FIG. 5 is flowed into the groove 103 and is in contact with a bottom surface (lower surface) of the groove 103. Although not illustrated in FIG. 5, the portion in contact with the bottom surface of the groove 103 is also in contact with a side surface, which is not illustrated, of the groove 103.

When the heater 161 is moved upward away from the deformed portion 106b from the state illustrated in FIG. 5, as illustrated in FIG. 6, the deformed portion 106b is solidified while maintaining the shape illustrated in FIG. 5 due to a decrease in temperature.

Figure 6A:
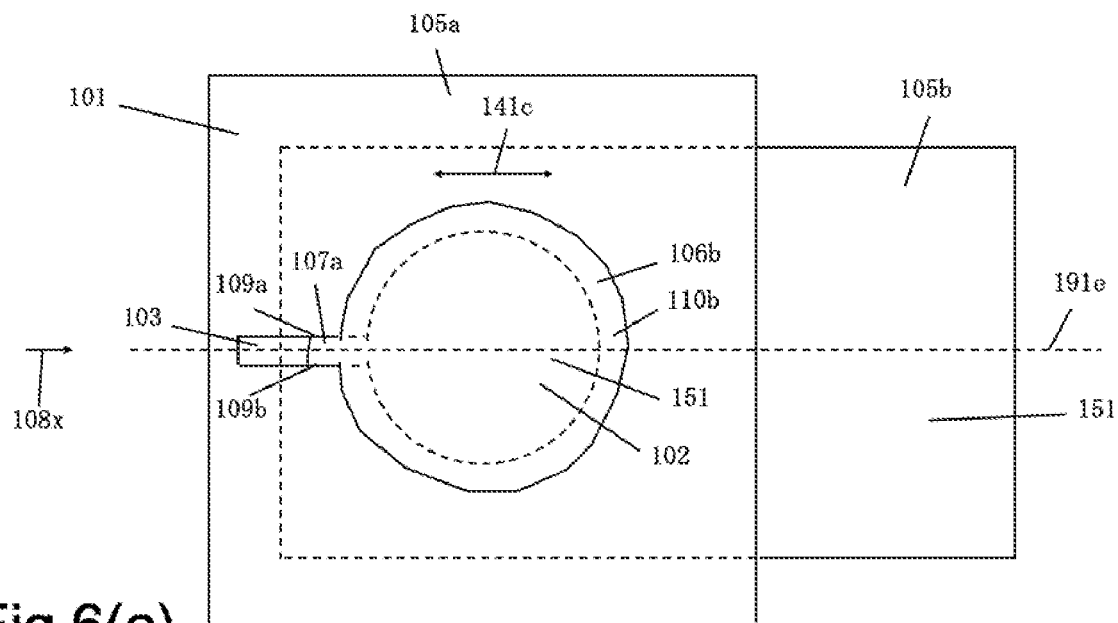
FIG. 6 are image diagrams each illustrating a combination of the fixing object and the fixation item, in which a deformed portion is solidified.
Figure 6B:
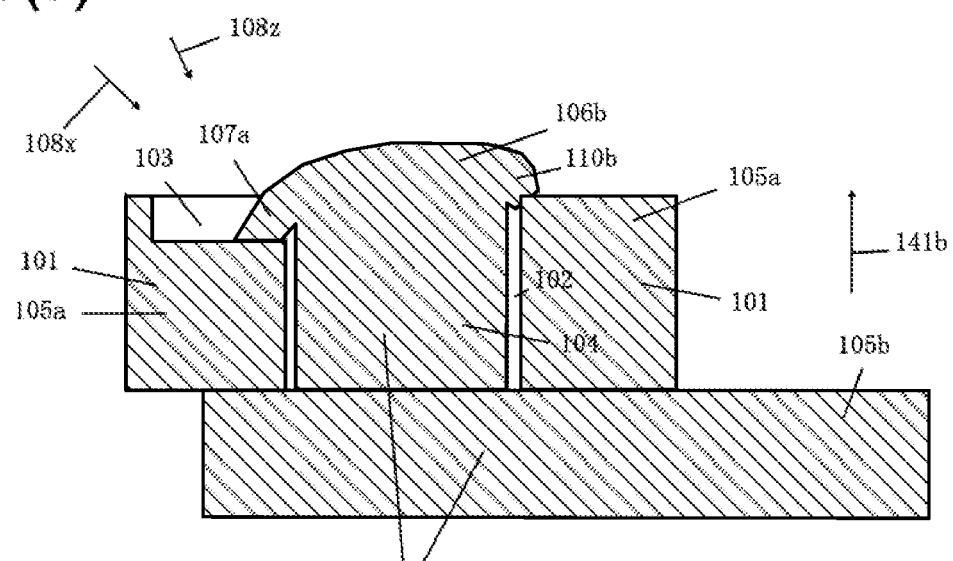

FIG. 6 are image diagrams each illustrating a combination of the fixing object 101 and the fixation item 151, in which the solidified deformed portion 106b is included. It is assumed that in the following description, the term "combination" refers to a combination of a fixing object and a fixation item, unless otherwise specified. FIG. 6(a) is a top view illustrating a combination of the fixing object 101 and the fixation item 151, and FIG. 6(b) is a sectional view of the combination of the fixing object 101 and the fixation item 151 assumed to be taken along a line 191e illustrated in FIG. 6(a).

In the deformed portion 106b, an inside groove deformed portion 107a, which is a portion formed within the groove 103, is in contact with side portions 109a and 109b. Accordingly, when a force relative to the fixation item 151 in a circumferential direction of the convex portion 104 as indicated by an arrow 141c is applied to the fixing object 101, the inside groove deformed portion 107a presses one surface of the groove-side surface 109a and the groove-side surface 109b. This makes it difficult for the inside groove deformed portion 107a to move. Therefore, the fixing object 101 does not move in the circumferential direction of the convex portion 104 relatively to the fixation item 151, except for a case where a breakage or the like of the inside groove deformed portion 107a occurs. The case that a breakage or the like of the inside groove deformed portion 107a occurs, is the case that the inside groove deformed portion 107a is separated from the deformed portion 106b other than the inside groove deformed portion 107a, or the case that the inside groove deformed portion 107a is greatly deformed.

In the deformed portion 106b, a deformed portion end 110b is in contact with the supporting part 105a and the inside groove deformed portion 107a is in contact with the bottom surface (lower surface) of the groove 103. Accordingly, a force relative to the fixation item 151 in a direction indicated by an arrow 141b illustrated in FIG. 6(b) is applied to the fixing object 101, the supporting part 105a presses the deformed portion end 110b and the bottom surface (lower surface) of the groove 103 presses the inside groove deformed portion 107a. Therefore, when the force relative to the fixation item 151 in a direction indicated by the arrow 141b is applied to the fixing object 101, the fixing object 101 does not move relatively to the fixation item 151 in the direction indicated by the arrow 141b, except for a case where a breakage or the like of the deformed portion 106b occurs. The case that the breakage or the like of the deformed portion 106b occurs, is the case that the deformed portion end 110b and the inside groove deformed portion 107a are separated from the deformed portion 106b other than the deformed portion end 110b and the inside groove deformed portion 107a, or the case that the deformed portion end 110b and the inside groove deformed portion 107a are greatly deformed.

Further, the combination illustrated in FIG. 6 has an advantage that whether or not the inside groove deformed portion 107a is formed in such a way as to be in contact with the groove bottom surface as expected can be easily discriminated by visual observation as described below.

Figure 7A:
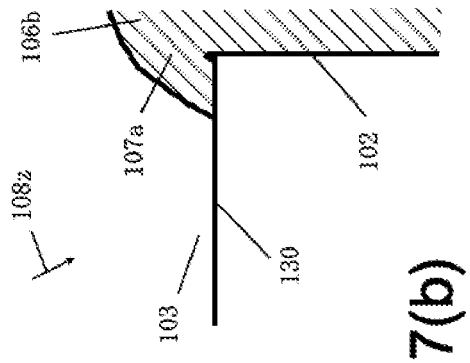
FIG. 7 are image diagrams each illustrating an observed state assuming a case where a portion in the vicinity of a boundary between a groove and a hole is observed.
Figure 7B:
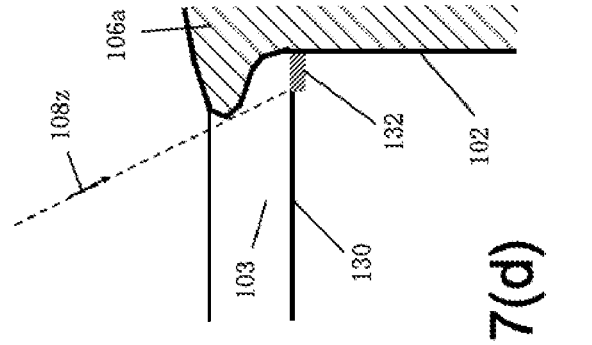

FIG. 7(a) is an image diagram illustrating an observed state assuming a case where light for observation is irradiated in a direction indicated by an arrow 108z illustrated in FIG. 6(b) and the vicinity of the boundary between the groove 103 and the hole 102 is observed along a direction indicated by an arrow 108x illustrated in FIGS. 6(a) and 6(b). FIG. 7(b) is a sectional view of the structure illustrated in FIG. 7(a) assumed to be taken along a line 191x illustrated in FIG. 7(a).

As illustrated in FIG. 7(a), it is observed that the inside groove deformed portion 107a is formed in such a way as to be in contact with the groove bottom portion 130 as illustrated in FIG. 7(b) due to a difference in brightness between the inside groove deformed portion 107a and the groove bottom portion 130. The structure in which the inside groove deformed portion 107a is formed in such a way as to be in contact with the groove bottom portion 130 is the same as the structure illustrated in FIG. 6. Accordingly, as illustrated in FIG. 6, except for a case where a breakage or the like of the inside groove deformed portion 107a occurs, the fixing object 101 illustrated in FIG. 6 does not move relatively to the fixation item 151 in the circumferential direction of the convex portion 104 as indicated by the arrow 141c. In other words, the structure illustrated in FIGS. 7(a) and 7(b) is a structure in which a misalignment between the fixing object 101 and the fixation item 151 is less likely to occur.

Figure 7C:
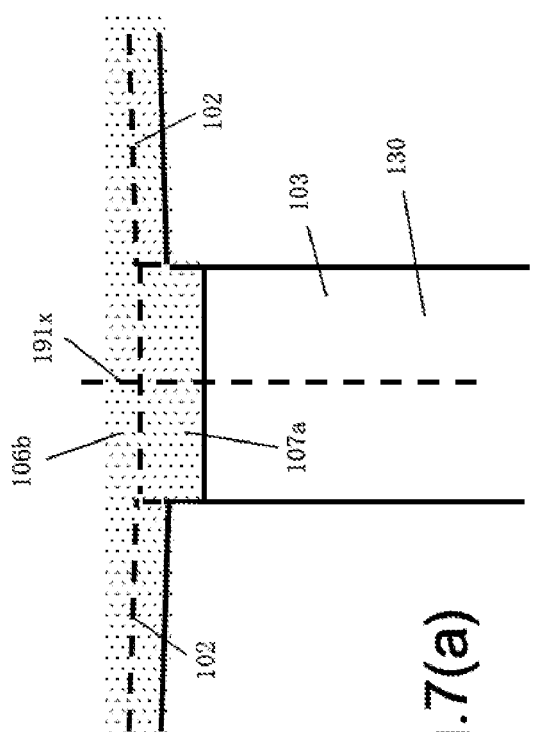
Figure 7D:
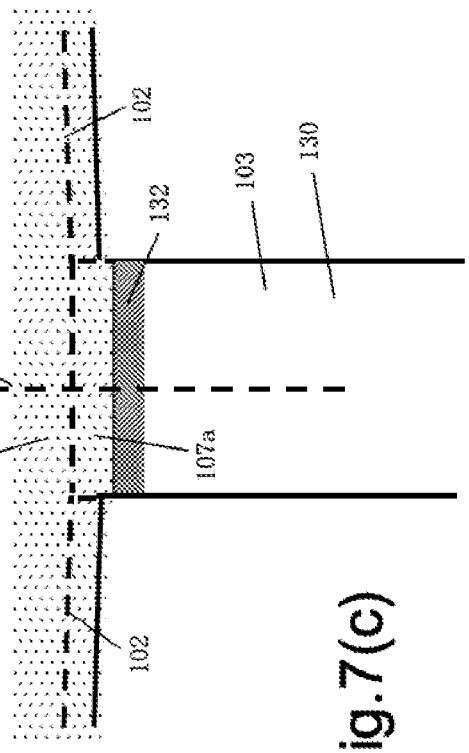

On the other hand, FIG. 7(c) is an image diagram illustrating an observed state in the vicinity of the boundary between the groove 103 and the hole 102 when a structure in which the deformed portion is not formed in such a way as to be in contact with the groove bottom portion 130 is observed. FIG. 7(d) is a sectional view of the structure illustrated in FIG. 7(a) assumed to be taken along the line 191x illustrated in FIG. 7(c).

When the deformed portion 106a as illustrated in FIG. 7(d) is not in contact with the groove bottom portion 130, as illustrated in FIGS. 7(c) and 7(d), a shadow 132 is formed. The shadow 132 is a shadow of the deformed portion 106a that is formed due to light irradiated for observation in the direction indicated by the arrow 108z. The shadow 132 is observed blackish as illustrated in FIG. 7(c). In the structure illustrated in FIGS. 7(c) and 7(d), since the deformed portion is not in contact with the groove bottom portion, the fixing object has a structure that is more likely to be misaligned with the fixation item. As illustrated in FIGS. 7(a) and 7(b), the shadow 132 is not observed when the inside groove deformed portion 107a is in contact with the groove bottom portion 130. Accordingly, it is possible to make an assessment whether the deformed portion 106a is in contact with the groove bottom portion 130 by observing whether a dark portion representing the shadow 132 is present or not.

Next, the fixed state of the fixing object to the fixation item will be described assuming a case where a groove corresponding to the groove 103 illustrated in FIG. 1 is not formed in the fixing object.

Figure 8A:
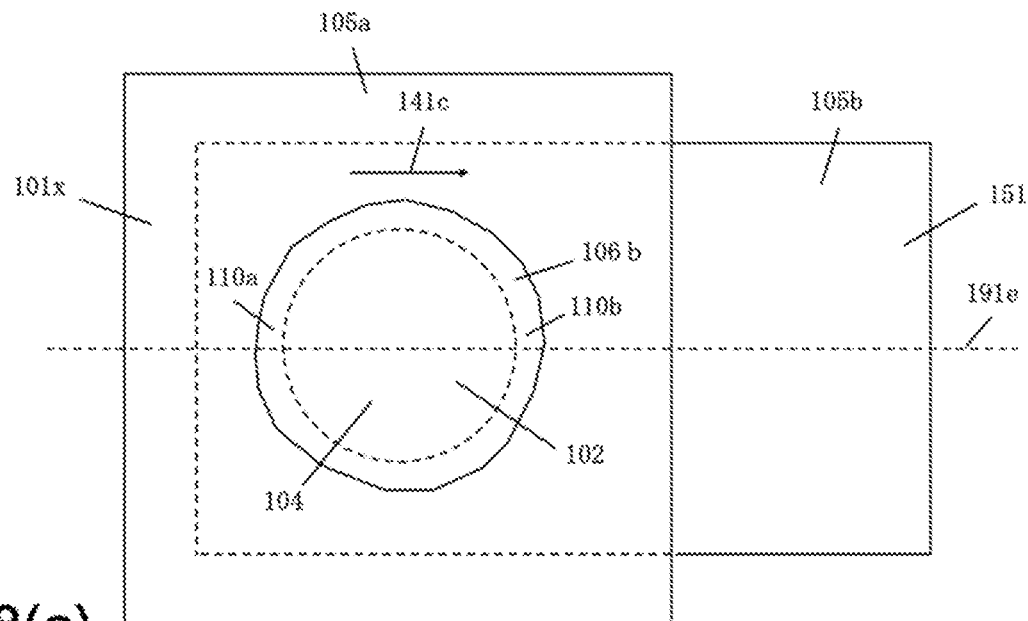
FIG. 8 are conceptual diagrams each illustrating a fixed state in which a fixing object including no groove is fixed to a fixation item.
Figure 8B:
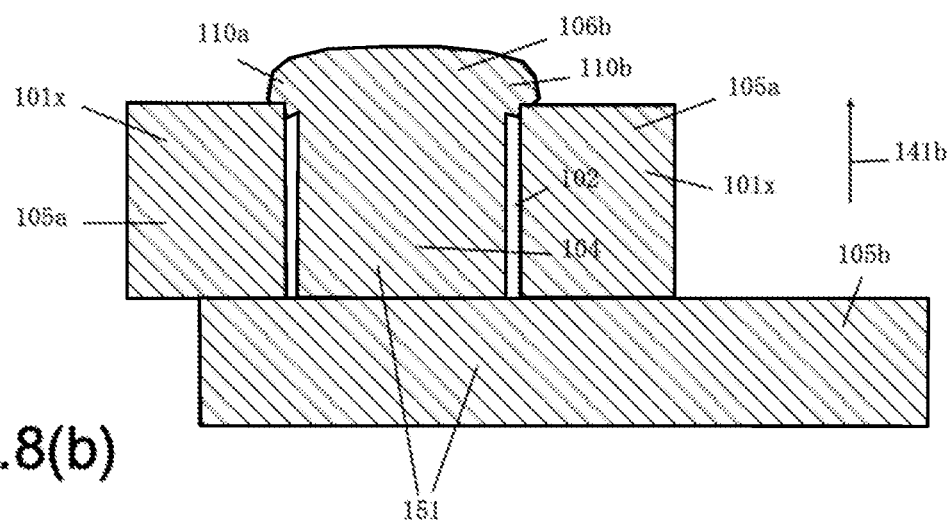

FIG. 8 are conceptual diagrams each illustrating a fixed state of a fixing object 101x, which does not include any groove corresponding to the groove 103 illustrated in FIG. 1, into the fixation item 151 illustrated in FIG. 2. FIG. 8(a) is a top view illustrating a combination of the fixing object 101x and the fixation item 151. FIG. 8(b) is a sectional view of the combination of the fixing object 101x and the fixation item 151 assumed to be taken along the line 191e illustrated in FIG. 8(a). FIG. 8 are diagrams illustrating a state corresponding to the state illustrated in FIG. 6, in which processing corresponding to heating processing using the heater illustrated in FIGS. 3 to 5 is performed on the combination of the fixing object 101x and the fixation item 151 and the deformed portion is further solidified.

In the combination of the fixing object 101x and the fixation item 151 illustrated in FIG. 8, a deformed portion end 110b, which is an end of the deformed portion 106a, is in contact with the supporting part 105a of the fixing object 101x. Accordingly, when a force relative to the fixation item 151 in the direction indicated by an arrow 141b illustrated in FIG. 8(b) is applied to the fixing object 101x, the supporting part 105a presses deformed portion ends 110a and 110b in the direction indicated by the arrow 141b. Therefore, when the force relative to the fixation item 151 in the direction indicated by the arrow 141b is applied to the fixing object 101, the fixing object 101 does not move relatively to the fixation item 151 in the direction indicated by the arrow 141b, except for a case where a breakage or the like of the deformed portion 106b occurs. The breakage or the like of the deformed portion 106b occurs when the deformed portion ends 110a and 110b are separated from the deformed portion 106b other than the deformed portion ends 110a and 110b, or when the deformed portion ends 110a and 110b are greatly deformed.

On the other hand, when a force relative to the fixation item 151 in a circumferential direction of the convex portion 104 as indicated by an arrow 141c illustrated in FIG. 8(a) is applied to the fixing object 101x, such a remarkable structure that the fixing object 101x is pressed by the surface of the deformed portion 106a does not exist. Accordingly, when the force relative to the fixation item 151 in the circumferential direction of the convex portion 104 as indicated by the arrow 141c is large to some extent, the fixing object 101x moves in the circumferential direction of the convex portion 104 as indicated by the arrow 141c. A movement of the fixing object 101x in the circumferential direction of the convex portion 104 as indicated by the arrow 141c may be generated without causing a breakage of the deformed portion 106b. The movement generated without causing a breakage of the deformed portion 106b is generally generated with a smaller force than a force in the movement involving a breakage of the deformed portion 106b.

On the other hand, in the combination illustrated in FIG. 6, as described above, a movement of the fixing object relative to the fixation item is less likely to be generated when the force relative to the fixation item 151 in the direction indicated by the arrow 141c is applied to the fixing object, as compared with the combination illustrated in FIG. 8. In other words, the use of the fixing object 101 according to this example embodiment can prevent a movement relative to the fixation item from being easily generated. Next, the structure of the groove in which, like the groove 103 illustrated in FIG. 1, the bottom surface of the groove located between the upper surface and the lower surface of the supporting part is not present and the groove is opened downward will be described.

Figure 9A:
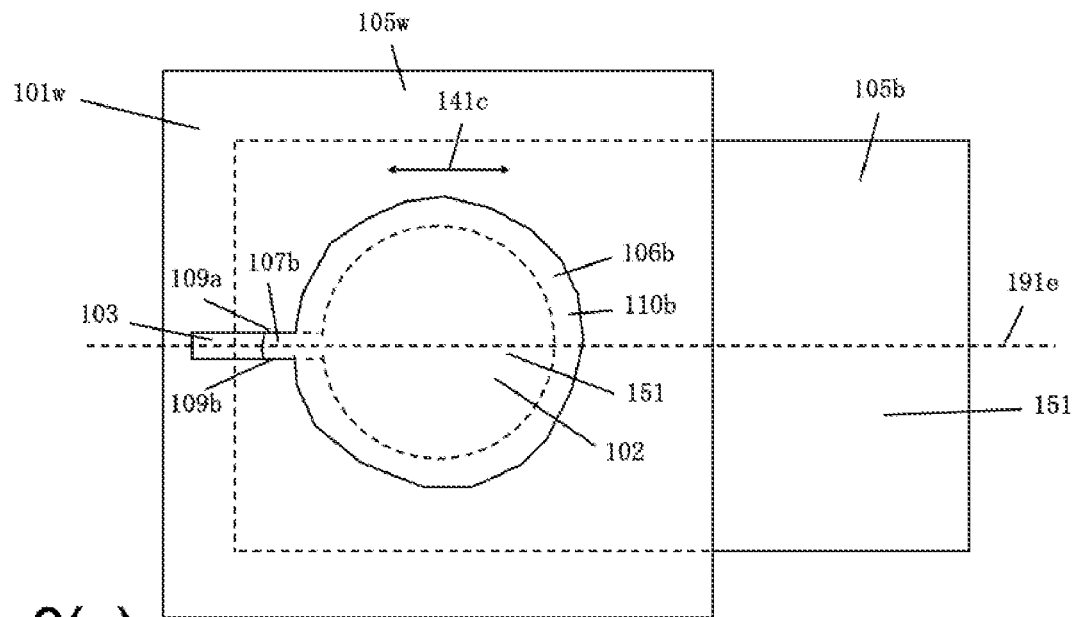
FIG. 9 are conceptual diagrams each illustrating a fixed state in which a fixing object including a groove opened further downward from a lower surface of a groove is fixed to a fixation item.
Figure 9B:
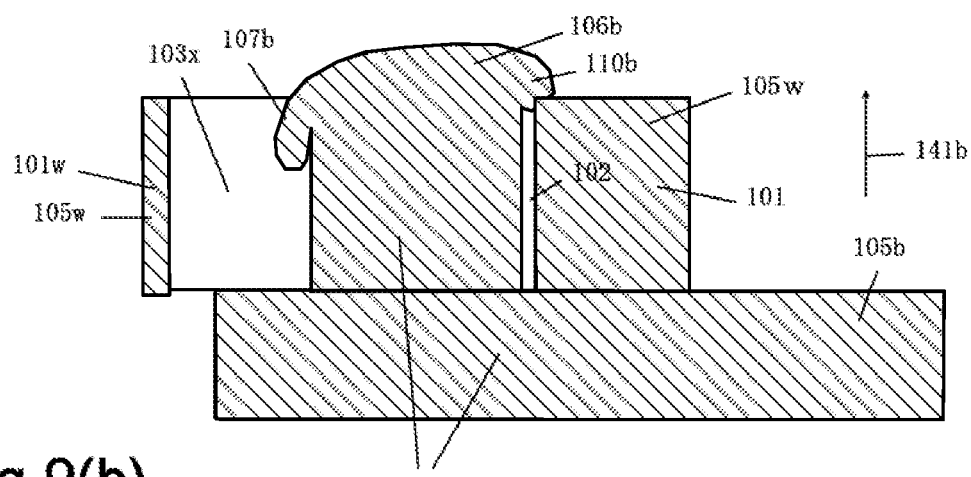

FIG. 9 are conceptual diagrams each illustrating a fixed state of the fixing object 101x, which includes a groove opened below the groove, into the fixation item 151 illustrated in FIG. 2. FIG. 8(a) is a top view of the combination of the fixing object 101x and the fixation item 151. FIG. 8(b) is a sectional view of the combination of the fixing object 101x and the fixation item 151 assuming a case where the combination is cut along the line 191e illustrated in FIG. 8(a). FIG. 8 illustrate the state corresponding to FIG. 6, in which processing corresponding to heating processing using the heater illustrated in FIGS. 3 to 5 is performed on the combination of the fixing object 101x and the fixation item 151, and the deformed portion is further cooled.

A groove 103x included in a supporting part 105w included in a fixing object 101w is opened downward of the groove 103x.

In the structure illustrated in FIG. 9, an inside groove deformed portion 107b, which is a part of the deformed portion 106b, is formed within the groove 103x.

The inside groove deformed portion 107b is in contact with groove-side surfaces 109a and 109b.

Accordingly, also in the structure illustrated in FIG. 9, the fixing object 101 does not move relatively to the fixation item 151 in the circumferential direction of the convex portion 104 as indicated by the arrow 141c, except for a case where a breakage or the like of the inside groove deformed portion 107b occurs. Like in the structure illustrated in FIG. 6, the fixing object is less likely to move relatively to the fixation item 151 in the circumferential direction of the convex portion 104.

However, when the fixing object including a groove opened downward, as described below, there is a problem that it is difficult to make an assessment, by visual observation, whether the deformed portion is formed within the groove as expected. The observed state of the deformed portion when the groove is opened further downward from a lower surface of the supporting part will be described below.

FIG. 10(a) is an image diagram illustrating an observed state in the vicinity of the boundary between the groove 103 and the hole 102 when a part of the deformed portion 106b is formed within a groove in the combination using the fixing object including the groove opened downward. FIG. 10(b) is a sectional view of the structure illustrated in FIG. 10(a) assumed to be taken along a line 191y illustrated in FIG. 10(a). Note that a portion below a thicker dashed line illustrated in FIG. 10(b) corresponds to the groove 103.

As illustrated in FIG. 10(a), a convex portion side surface 113 is observed within the groove 103. A shadow 132b is also observed. As illustrated in FIG. 10(b), the shadow 132b is a shadow of the deformed portion 106b that is formed in the convex portion side surface 113 due to light for observation irradiated in the direction indicated by the arrow 108z. However, a difference in brightness between the shadow 132b and a portion other than the shadow of the convex portion side surface 113 is not remarkable.

The reason why the difference in brightness is not remarkable is that a direction of the light irradiated for observation corresponds to the direction indicated by the arrow 108z, and a direction of observation corresponds to the direction indicated by the arrow 108x. In other words, this is because a small amount of light in the direction indicated by the arrow 108z is reflected by the convex portion side surface 113 and returned in a direction opposite to the direction indicated by the arrow 108x. Accordingly, the convex portion side surface other than the shadow appears dark, and thus it is difficult to observe the difference in brightness between the shadow 132b and the convex portion side surface other than the shadow.

FIG. 10(c) is an image diagram illustrating an observed state in the vicinity of the boundary between the groove 103 and the hole 102 in the structure in which a part of the deformed portion 106a is not formed within the groove. FIG. 10(d) is a sectional view of the structure illustrated in FIG. 10(c) assumed to be taken along the line 191y illustrated in FIG. 10(c). Note that a portion below a thicker dashed line illustrated in FIG. 10(d) corresponds to the groove 103.

As illustrated in FIG. 10(c), the convex portion side surface 113 is observed within the groove 103. A shadow 132c is also observed. As illustrated in FIG. 10(d), the shadow 132c is a shadow generated on the convex portion side surface 113 due to light for observation irradiated in the direction indicated by the arrow 108z. However, a difference in brightness between the shadow 132c and a portion other than the shadow of the convex portion side surface 113 is not very remarkable. This is because the direction of light irradiated for observation corresponds to the direction indicated by the arrow 108z and the direction of observation corresponds to the direction indicated by the arrow 108x. In other words, a small amount of light in the direction indicated by the arrow 108z is reflected by the convex portion side surface 113 and returned in a direction opposite to the direction indicated by the arrow 108x. Accordingly, the entire convex portion side surface appears dark, and thus it is difficult to discriminate the difference in brightness between the shadow 132c and the convex portion side surface.

As is obvious from comparison between FIG. 10(a) and FIG. 10(c), the observed state of the structure in which a part of the deformed portion 106b is formed within the groove 103 as illustrated in FIG. 10(b) is similar to the observed state of the structure in which a part of the deformed portion 106a is not formed within the groove 103 as illustrated in FIG. 10(d). In other words, a shadow is observed in both the structure illustrated in FIG. 10(b) and the structure illustrated in FIG. 10(d). The shadow 132b illustrated in FIG. 10(a) and the shadow 132c illustrated in FIG. 10(c) differ in the vertical width but are the same in that a shadow is observed. Accordingly, whether or not a part of the deformed portion is formed within the groove 103 as expected cannot be discriminated depending on the presence or absence of a shadow. Further, as described above, there is a small difference in brightness between the shadows 132b and 133c and the convex portion side surface 113 other than the shadow. Accordingly, it is also difficult to discriminate the difference in the vertical width of the shadows.

As described above with reference to FIG. 7 and FIG. 10, in the combination with a deformed portion formed thereon, it may be more easily assessed by observation that a part of the deformed portion of the fixing object 101 illustrated in FIG. 1 is formed within the groove 103 as expected or not. Such assessment can be made more easily than in the structure in which the groove is opened downward of the supporting part lower surface.

Next, variation examples of the groove shape will be described.

FIG. 11 are conceptual diagrams each illustrating a variation example of the groove shape, assuming a case where the groove is viewed from the top (corresponding to FIG. 1(a)). FIGS. 11(a) to 11(e) also illustrate the shape of the hole 102 assumed as viewed from the top.

Figure 11D:
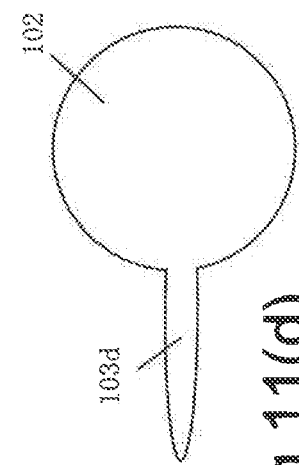
FIG. 11 are conceptual diagrams each illustrating a variation example of a shape viewed from an upper surface of the groove.
Figure 11E:
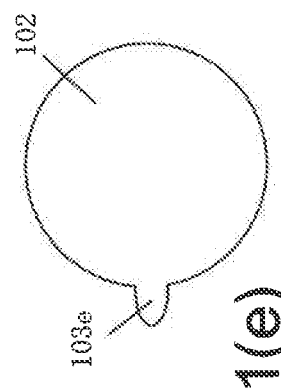
Figure 11A:
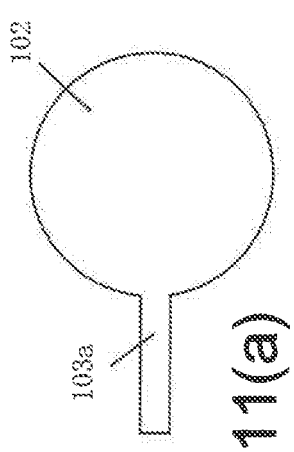

FIG. 11(a) illustrates a groove 103a having a rectangular shape, like FIG. 1(a). A portion at one short side of the groove 103a is connected to the hole 102.

Figure 11B:
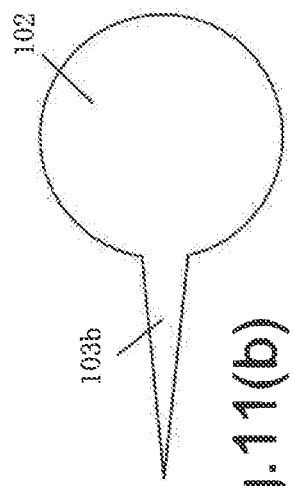

FIG. 11(b) illustrates a groove 103b having an isosceles triangle shape. A portion at a bottom side of the isosceles triangle shape of the groove 103b is connected to the hole 102.

Figure 11C:
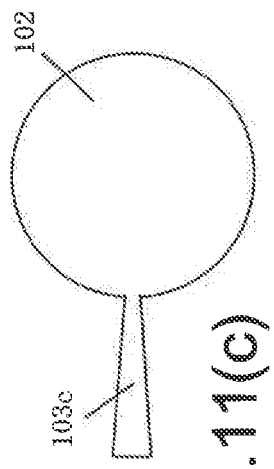

FIG. 11(c) illustrates a groove 103c having a trapezoidal shape. A portion at an upper side of the trapezoidal shape of the groove 103c is connected to the hole 102.

FIG. 11(d) illustrates a groove 103d having a shape similar to a part of an elliptical shape. The groove 103d is connected to the hole 102 as illustrated in FIG. 11(d).

FIG. 11(e) illustrates a groove 103e having a shape similar to a part of an elliptical shape. A part of the elliptical shape similar to the shape of the groove 103e has a larger ratio of a breadth thereof to a length thereof than that of a part of the elliptical shape similar to the shape of the groove 103d illustrated in FIG. 11(d). The groove 103e is connected to the hole 102 as illustrated in FIG. 11(e).

FIG. 12 are conceptual diagrams each illustrating a variation example of a sectional shape of the groove (corresponding to FIG. 1(b)). FIGS. 12(a) to 12(d) also illustrate the supporting part and the hole 102. As illustrated in FIGS. 12(a) to 12(d), the line 181 indicates the upper surface of the supporting part, the line 182 indicates the lower surface of the supporting part, and the line 186 indicates the boundary between the hole 102 and the groove.

Figure 12A:
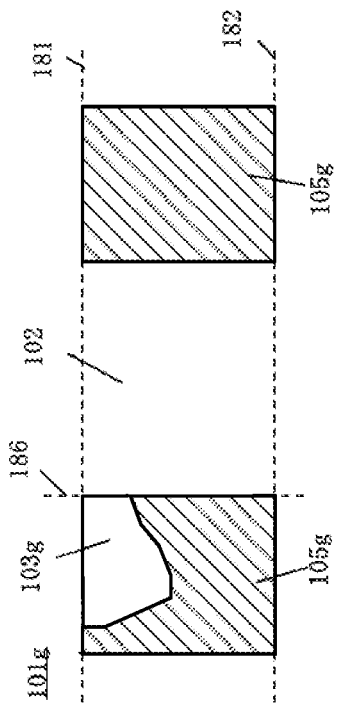
FIG. 12 are conceptual diagrams each illustrating a variation example of a sectional shape of the groove.

The fixing object 101 illustrated in FIG. 12(a) is identical to the fixing object 101 illustrated in FIG. 1.

Figure 12B:
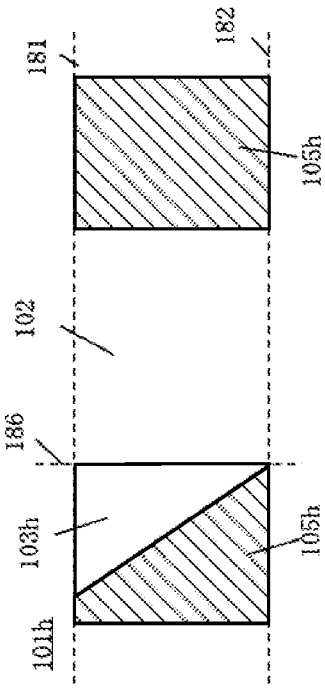

A fixing object 101f illustrated in FIG. 12(b) includes a supporting part 105f which is provided with a groove 103f and the hole 102.

A distance from the upper surface of the supporting part 105f indicated by the line 181 to the bottom surface (lower surface) of the groove 103f gradually decreases leftward as viewed toward FIG. 12(b) from the boundary between the hole 102 and the groove 103f as indicated by the line 186.

Figure 12C:
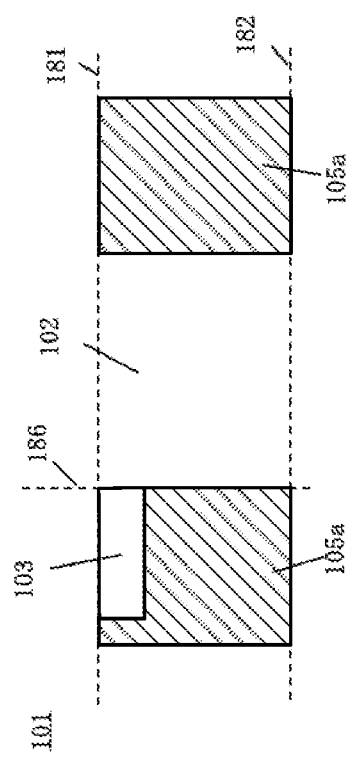

A fixing object 101g illustrated in FIG. 12(c) includes a supporting part 105g which is provided with a groove 103g and the hole 102.

A distance from the upper surface of the supporting part 105g indicated by the line 181 to a lower end of the groove 103g gradually increases as going away leftward as viewed toward FIG. 12(c) from the boundary between the hole 102 and the groove 103g as indicated by the line 186, and then the distance decreases.

Figure 12D:
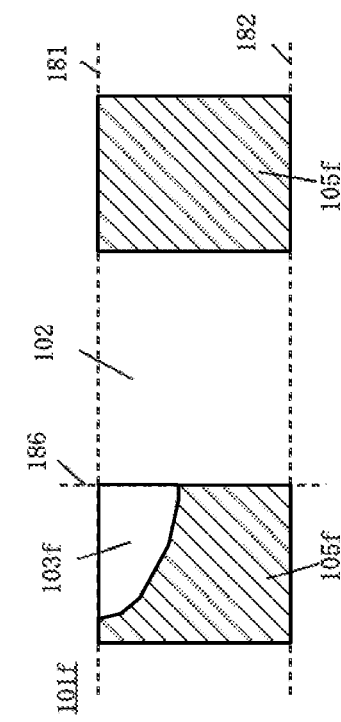

A fixing object 101h illustrated in FIG. 12(d) includes a supporting part 105h which is provided with a groove 103h and the hole 102.

The position of a lower end of the groove 103h matches a lower surface of the supporting part 105h indicated by the line 182 at the boundary between the hole 102 and the groove 103h as indicated by the line 186. A distance from an upper surface of the supporting part 105h indicated by the line 181 to a lower end of the groove 103h gradually decreases linearly as going away leftward as viewed toward FIG. 12(b) from the boundary between the hole 102 and the groove 103h as indicated by the line 186.

The lower end of the groove may be opened downward, in a prescribed case as described below.

Figure 13:
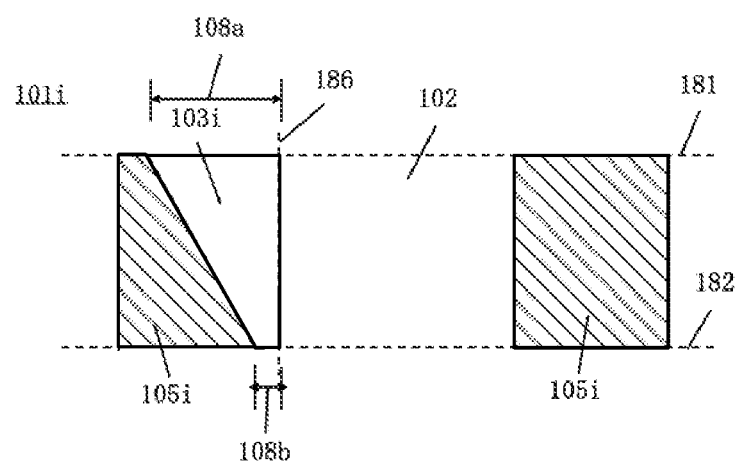
FIG. 13 is a conceptual diagram illustrating an example of a groove having a lower end thereof opened downward of a supporting part.

FIG. 13 is a conceptual diagram illustrating a fixing object 101i including a groove 103i which is an example of the groove, a part of a lower end of which is opened downward.

The groove 103i is opened downward at the boundary between the hole 102 and the groove 103i as indicated by the line 186.

The opened state of the groove 103i continues as going away leftward of FIG. 13 from the boundary between the hole 102 and the groove 103i as indicated by the line 186.

As further going away leftward of FIG. 13 from the boundary between the hole 102 and the groove 103i as indicated by the line 186, a lower surface of the groove 103i matches a lower surface of a supporting part 105i indicated by the line 182.

As further going away leftward as viewed toward FIG. 13 from the boundary between the hole 102 and the groove 103i as indicated by the line 186, a distance between an upper surface of the supporting part 105*i* indicated by the line 181 and the lower surface of the groove 103*i* decreases linearly. The lower surface of the groove 103*i* matches the upper surface of the supporting part 105*i* indicated by the line 181, and the lower surface of the groove 103*i* is not the groove 103*i* any more.

A distance indicated by an arrow 108*a* illustrated in FIG. 13 is longer than a distance indicated by an arrow 108*b* illustrated in FIG. 13. In this case, the distance indicated by the arrow 108*b* illustrated in FIG. 13 is a distance from the boundary between the hole 102 and the groove 103*i* as indicated by the line 186 to the position where the lower end of the groove 103*i* matches the lower surface of the supporting part 105*i* indicated by the line 182. The distance indicated by the arrow 108*a* illustrated in FIG. 13 is a distance from the boundary between the hole 102 and the groove 103*i* as indicated by the line 186 to the position where the lower surface of the groove 103*i* matches the upper surface of the supporting part 105*i* indicated by the line 181.

A part of the upper surface of the groove need not be opened upward.

Figure 14A:
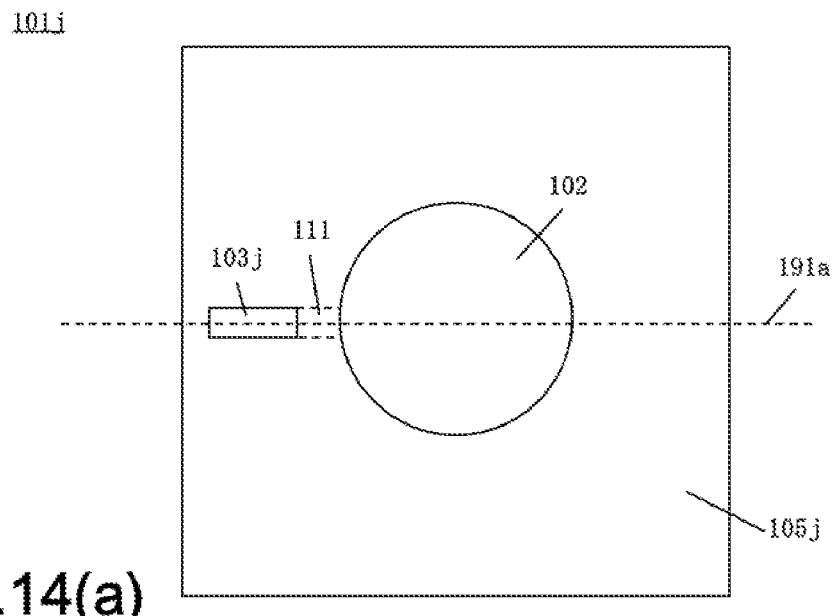
FIG. 14 are conceptual diagrams each illustrating an example of a groove having an upper surface thereof, a part of which is not opened upward.
Figure 14B:
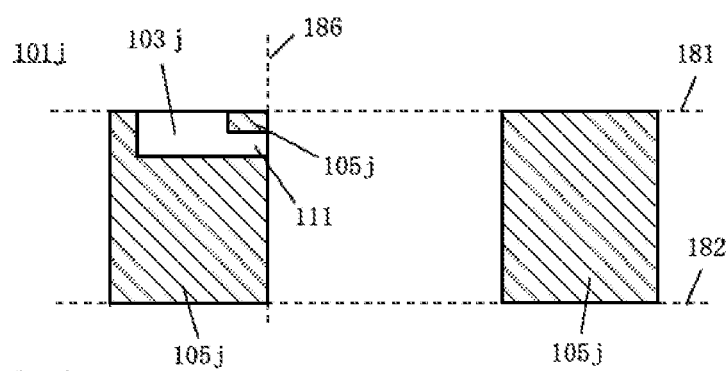

FIG. 14 are conceptual diagrams each illustrating a fixing object 101*j* including a groove 103*j* as an example of the groove, a part of which is not opened upward. FIG. 14(*a*) is a top view of the fixing object 101*j*, and FIG. 14(*b*) is a sectional view of the fixing object 101*j* assumed to be taken along the line 191*a* illustrated in FIG. 14(*a*).

At the boundary between the hole 102 and the groove 103*j* as indicated by the line 186 illustrated in FIG. 14(*b*), the groove 103*j* is an inside groove 111 and supporting parts 105*j* are present above and below the groove 103*j*.

As moved leftward as viewed from the front side of FIG. 14 from the boundary between the hole 102 and the groove 103*j* as indicated by the line 186, the inside groove 111 is continuously formed and then the upper portion of the groove 103*j* is opened.

As further moved leftward as viewed from the front side of FIG. 14 from the boundary between the hole 102 and the groove 103*j* as indicated by the line 186, the groove 103*j* whose upper portion is opened is continuously formed and then the groove 103*j* disappears.

An object present above the inside groove may be an object different from the object constituting the supporting part.

Figure 15A:
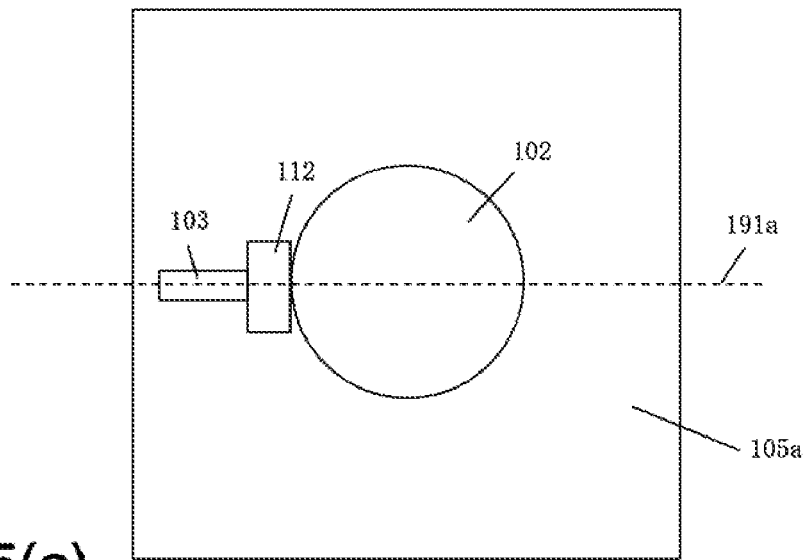
FIG. 15 are conceptual diagrams each illustrating an example of a groove including an inside groove that includes an object different from an object constituting the supporting part at an upper portion of the inside groove.
Figure 15B:
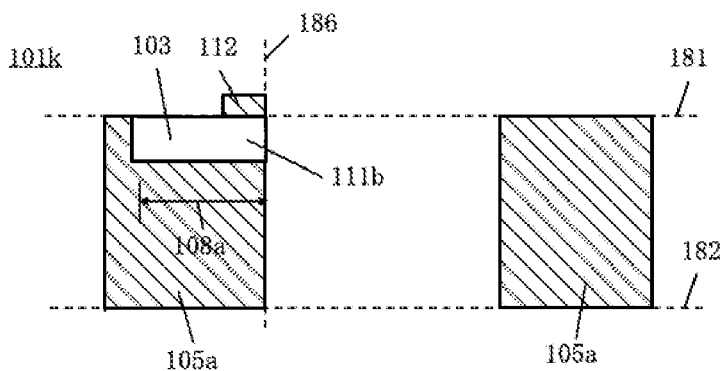

FIG. 15 are conceptual diagrams each illustrating a fixing object 101*k* including the groove 103 as an example of the groove including an inside groove including an object different from the object constituting the supporting part at an upper portion of the inside groove. FIG. 15(*a*) is a top view of the fixing object 101*k*, and FIG. 15(*b*) is a sectional view of the fixing object 101*k* assumed to be taken along the line 191*a* illustrated in FIG. 15(*a*).

The fixing object 101*k* includes a structure that is the same as the structure included in the fixing object 101 illustrated in FIG. 1, and further includes a member 112. The member 112 is formed within a certain distance range leftward as viewed from the front side of FIG. 15 from the boundary between the hole 102 and the groove 103*k* as indicated by the line 186. The member 112 is formed above the inside groove 111*b* and on the supporting part 105*a* at the periphery of the inside groove 111*b*.

The number of grooves formed in the fixing object is arbitrary.

FIG. 16 are image diagrams each illustrating a variation example of the number of grooves included in the fixing object and positions of the grooves.

FIG. 16(*a*) illustrates an example of a case where the number of grooves formed in the fixing object is one, like in the fixing object 101 illustrated in FIG. 1. As illustrated in FIG. 16(*a*), the groove 103*a* is connected to the hole 102.

FIG. 16(*b*) illustrates a first example of a case where the number of grooves formed in the fixing object is two. As illustrated in FIG. 16(*b*), the grooves 103*a* and 103*b* are connected at opposed positions at the periphery of the hole 102.

FIG. 16(*c*) illustrates a second example of the case where the number of grooves formed in the fixing object is two. The grooves 103*a* and 103*c* are connected to the hole 102 as illustrated in FIG. 16(*c*).

FIG. 16(*d*) is a third example of the case where the number of grooves formed in the fixing object is two. The grooves 103*a* and 103*d* are connected to the hole 102 as illustrated in FIG. 16(*d*).

FIG. 16(*e*) illustrates an example of a case where the number of grooves formed in the fixing object is four. The grooves 103*a*, 103*b*, 103*c*, and 103*d* are connected to the outer periphery of the hole 102 at regular intervals as illustrated in FIG. 16(*e*).

In a case where grooves have the same shape, as the number of grooves increases, a misalignment between the fixing object and the fixation item is less likely to occur when the inside groove deformed portion is formed. The reason why a misalignment between the fixing object and the fixation item is less likely to occur is that the number of contact areas between the inside groove deformed portion and the groove-side surface increases as the number of grooves increases. In other words, the reason why the misalignment is less likely to occur is that when the number of grooves increases, if a breakage or the like of the inside groove deformed portion formed in more grooves does not occur, a misalignment between the fixing object and the fixation item does not occur.

The fixed state between the fixing object and the fixation item when a member including a button is used as the fixing object and a panel is used as the fixation item will be described below.

First, a case where a fixing object which is different from the fixing object according to this example embodiment and does not include the groove as described above with reference to FIGS. 1, 11, 12, 13, and 16 is combined with the fixation item will be described.

Figure 17:
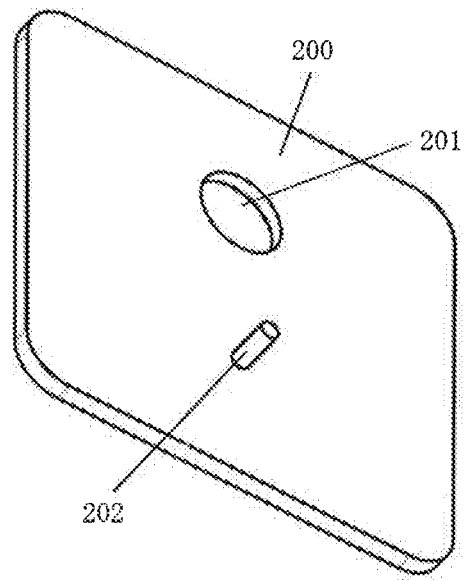
FIG. 17 is a perspective view illustrating an example of a fixation item.

FIG. 17 is a perspective view illustrating a fixation item 151*v* as an example of the fixation item to be combined with the fixing object.

The fixation item 151*v* is a resin panel 200.

The resin panel 200 includes a welding boss 202. The welding boss 202 is a portion corresponding to the convex portion 104 illustrated in FIG. 2.

The resin panel 200 is provided with a button hole 201.

Figure 18:
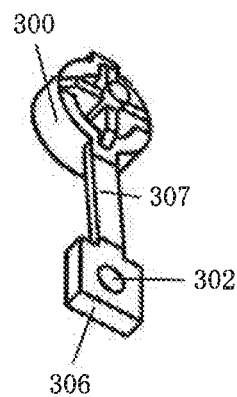
FIG. 18 is a perspective view illustrating an example of a fixing object.

FIG. 18 is a perspective view illustrating a fixing object 101*v* as an example of a fixing object that is different from the fixing object according to this example embodiment.

The fixing object 101*v* includes a button 300, a supporting part 306, and a spring 307. The supporting part 306 is not provided with the groove that is described above with reference to FIGS. 1, 11, 12, 13, and 16.

Figure 19A:
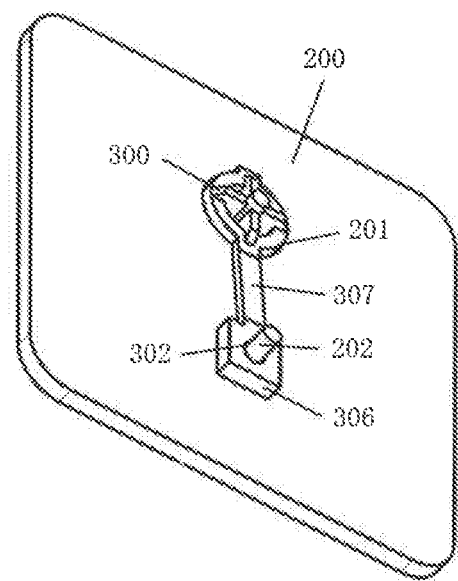
FIG. 19 are diagrams each illustrating a state where a fixation item and a fixing object are combined.
Figure 19B:
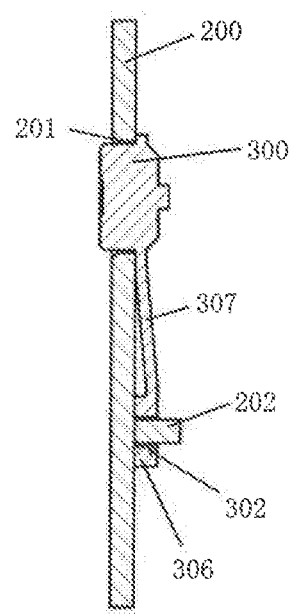

Next, the fixation item 151*v* illustrated in FIG. 17 and the fixing object 101*v* illustrated in FIG. 18 are combined as illustrated in FIG. 19. In the combination illustrated in FIG. 19, the welding boss 202 included in the panel 200 is inserted into a welding boss insertion hole 302 which is formed in the supported part 302. Further, in the combination illustrated in FIG. 19, the button 300 is inserted into the button hole 201.

Figure 20A:
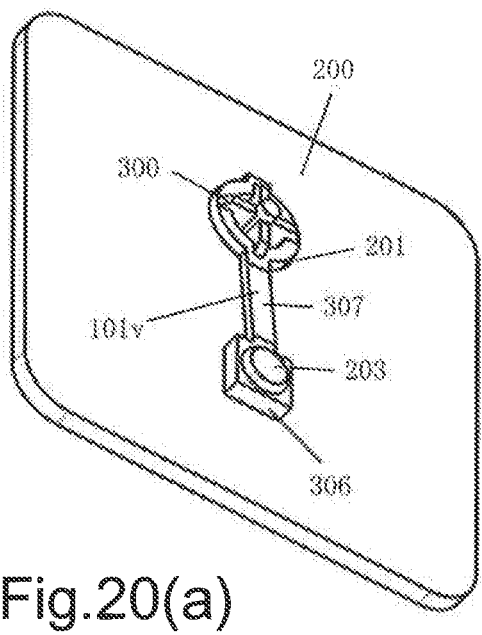
FIG. 20 are diagrams each illustrating a combination of the fixing object and the fixation item, in which a welded boss is formed.
Figure 20B:
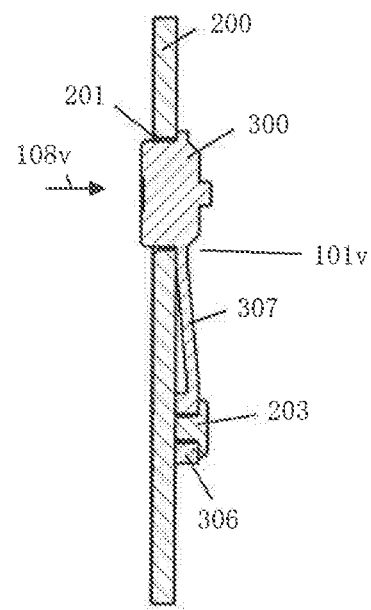

As illustrated in FIG. 20, the welding boss 202 illustrated in FIG. 19 is deformed by heating, thereby forming a welded boss 203. FIG. 20(a) illustrates a perspective view of a combination, and FIG. 20(b) illustrates a sectional view of the combination.

Figure 20C:
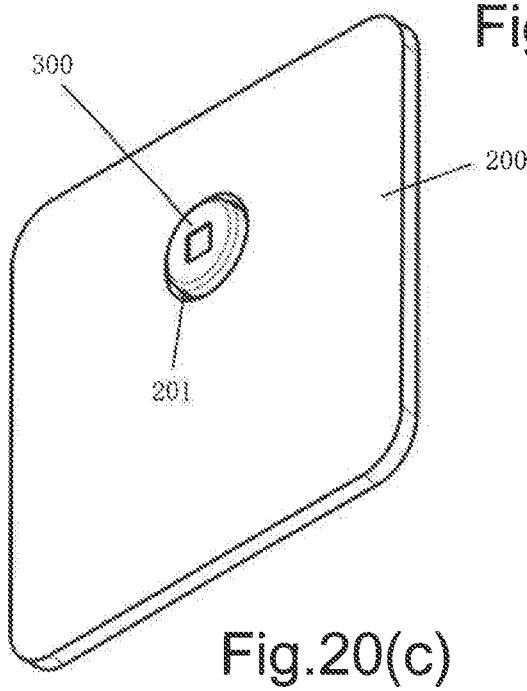

FIG. 20(c) is a perspective view of the structure illustrated in FIG. 20(a) as viewed from an opposite side of the panel 200.

In the structure illustrated in FIG. 20, it is assumed that the button 300 is pressed in a direction indicated by an arrow 108v illustrated in FIG. 20(b), thereby allowing the button 300 to move in the direction indicated by the arrow 108v. It is assumed that the pressing of the button 300 in the direction indicated by the arrow 108v is stopped, thereby allowing the spring 307 to move the button 300 in a direction opposite to the direction indicated by the arrow 108v.

The supporting part 306 included in the fixing object 101v does not include the groove corresponding to the groove described above with reference to FIGS. 1, 11, 12, 13, and 16, so that a misalignment of the fixing object 101v with respect to the fixation item 151v may occur. When a misalignment of the fixing object 101v with respect to the fixation item 151v occurs, the button 300 and a side surface of the button hole 201 may be in contact with each other. When the button 300 and the side surface of the button hole 201 are in contact with each other, the button 300 may be hooked on the side surface of the button hole 201, which may inhibit the movement of the button 300 in a direction parallel to the direction indicated by the arrow 108v. When the movement of the button 300 in the direction parallel to the direction indicated by the arrow 108v is inhibited, the expected operation as described above is not carried out on the button 300.

Figure 16A:
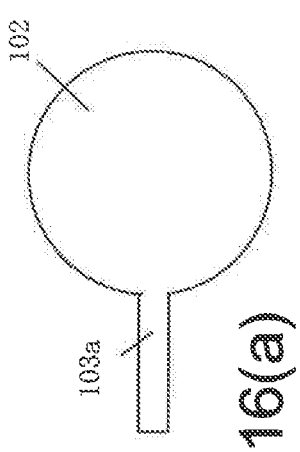
FIG. 16 are image diagrams each illustrating a variation example of the number of grooves to be included.
Figure 16B:
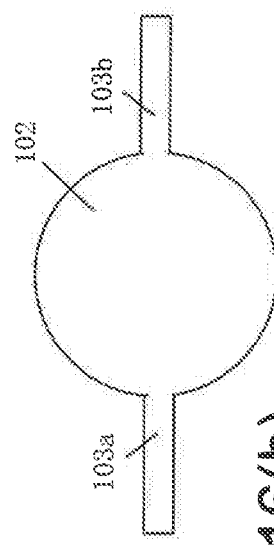
Figure 16C:
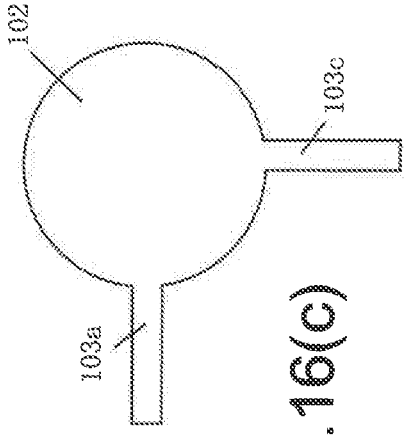
Figure 16D:
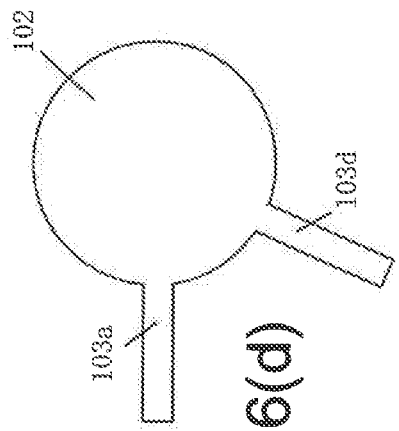
Figure 16E:
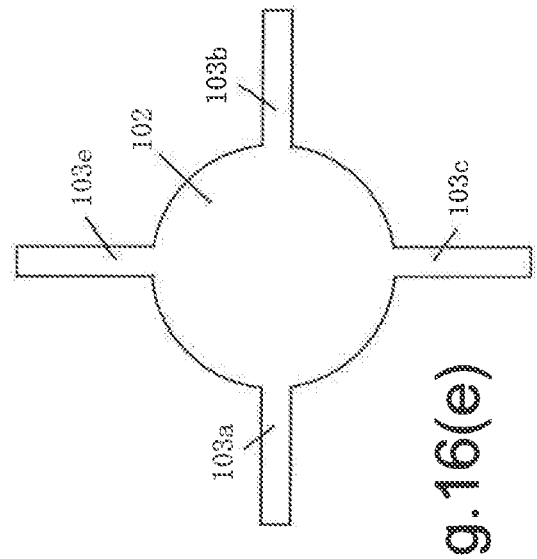
Figure 21:
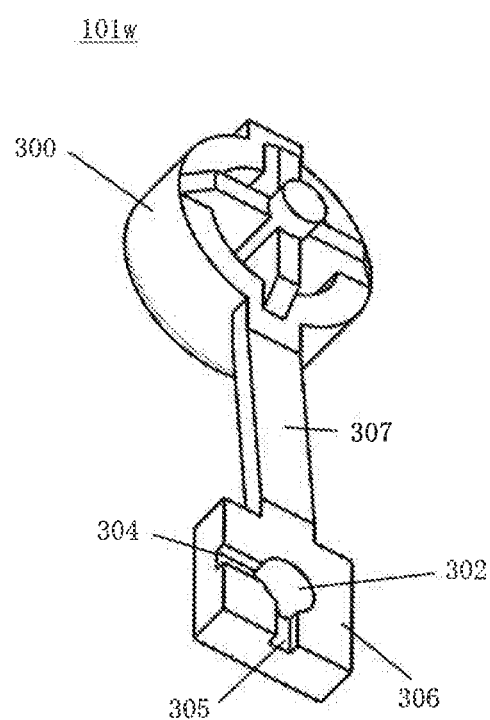
FIG. 21 is a perspective view illustrating a fixing object including a supporting part having a horizontal groove and a vertical groove formed therein.

Accordingly, it is assumed that the fixing object 101w according to this example embodiment which is illustrated in the perspective view of FIG. 21 and includes grooves corresponding to the grooves 103a and 103c illustrated in FIG. 16(c) is used. A supporting part 306w included in the fixing object 101w illustrated in FIG. 21 is provided with a horizontal groove 304 and a vertical groove 305.

FIG. 22 are diagrams each illustrating a structure in which the fixing object 101w illustrated in FIG. 21 is combined with the fixation item 151v illustrated in FIG. 17 and the welding boss 202 illustrated in FIG. 17 is deformed by heating, thereby forming the welded boss 203. FIG. 22(a) is a perspective view of the combination, and FIG. 22(b) is a sectional view of the combination.

A square area surrounded by a dashed line illustrated in FIG. 22(b) is an enlarged view of a round area surrounded by a dashed line illustrated in FIG. 22(b).

As represented by the square area surrounded by the dashed line, the welded boss 203 is also inserted into the horizontal groove 304 formed in the supporting part 306. Accordingly, for the same reason as described above with reference to FIG. 6, a misalignment between the supporting part 306 and the panel 200 is less likely to occur. Therefore, the probability that the button 300 can be continuously moved as expected as described above with reference to FIG. 20 is increased. In this case, in order to increase the probability that the button can be continuously moved as expected, the button hole 201 and the button 300 are combined by adjusting the positional relationship therebetween in such a way as to move the button as expected. After that, the fixing object 101w is fixed to the fixation item 151v, while the positional relationship between the button hole 201 and the button 300 is maintained.

Advantageous Effects

A fixing object according to this example embodiment includes a groove connected to a hole formed in the fixing object in order to insert a convex portion of a fixation item. Accordingly, the convex portion of the fixation item is inserted into the hole of the fixing object to combine the fixing object and the fixation item. After that, when the convex portion is deformed by heating or the like, a part of the deformed convex portion (deformed portion) is inserted into the groove. Therefore, in the combination of the fixing object and the fixation item, a relative misalignment between the fixing object and the fixation item is less likely to occur due to the presence of the deformed portion inserted into the groove, for the reason described above with reference to FIG. 6.

Further, in the fixing object according to this example embodiment, the distance from the boundary between the groove and the hole in a portion that is opened at an upper surface is longer than that in a portion that is opened at a lower surface. Accordingly, the groove included in the fixing object according to this example embodiment has a bottom surface. Therefore, there is a possibility that the deformed portion formed within the groove may be in contact with the bottom surface of the groove included in the fixing object according to this example embodiment. When the deformed portion is in contact with the bottom surface of the groove, as described above with reference to FIG. 7, it can be easily discriminated, by visual observation, whether or not the deformed portion is in contact with the bottom surface of the groove. In other words, when the fixing object according to this example embodiment is combined with the fixation item, there is high probability that the discrimination by observation as to whether or not the fixation between the fixing object and the fixation item is strong can be easily made.

In other words, in the fixing object according to this example embodiment, the probability that the quality of the fixed state in which the fixing object is fixed to the fixation item will be visually assessable can be improved.

Note that in the fixing object according to this example embodiment, the groove and the hole formed in the fixing object may be integrally formed and it may be difficult to separate the groove and the hole from each other. When it is difficult to separate the groove and the hole from each other, it is assumed that a portion with a bottom surface corresponds to the groove and a portion with no bottom surface is the hole.

Note that in the example embodiments described above, a case where the groove is connected to the hole is described. However, the groove need not necessarily be connected to the hole, as long as the groove is formed in proximity to the hole. This is because, if the groove is formed in proximity to the hole, a part of the deformed portion may be inserted into the groove and may be in contact with the groove bottom portion.

Further, in the example embodiments described above, a hole having a shape hollowed with a cylindrical shape is illustrated as an example of the hole included in the fixing object. However, the shape of the hole can be arbitrary as long as the convex portion included in the fixation item can be inserted into the hole.

Further, in the example embodiments described above, a case where the deformed portion is formed by heating the convex portion is illustrated by way of example. However, any method of forming the deformed portion may be used as long as the deformed portion can be formed so as to be in contact with the groove bottom portion included in a fixed portion due to deformation.

Figure 23:
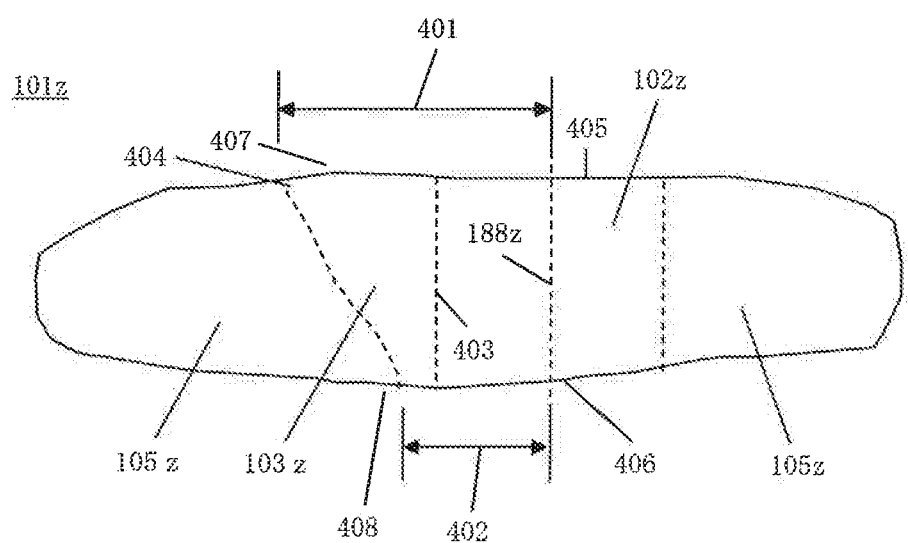
FIG. 23 is a sectional conceptual diagram illustrating a minimum structure of a fixing object according to the present invention.

Note that FIG. 23 is a sectional conceptual diagram illustrating a fixing object 101z as a minimum structure of the fixing object according to the present invention.

The fixing object 101z includes a supporting part 105z which includes a hole 102z and a groove 103z that is formed in proximity to the hole 102z.

A line 188z indicates the center of gravity of the hole 102 at each height position of the hole 102z (hereinafter referred to simply as the "center of gravity").

The groove 103z includes a one-way open part which is opened at a surface 407 of the supporting part 105z where one exit 405 of the hole 102z is present, and which is not opened at the surface of the supporting part 105z where another exit 406 of the hole 102z is present.

Further, the following relationship is established at the surface 407 of the supporting part 105z with a longer distance from a portion 404 of the groove 103z, which is farthest from the center of gravity of the hole 102z, to the center of gravity. Specifically, a distance 401 from the portion 404 of the groove 102z, which is farthest from the center of gravity, to the center of gravity is longer than the distance from a side-surface portion, which is not illustrated, of the hole 102z that is located at a position closest to the groove 103z and is not in contact with the groove 103z, to the center of gravity.

Note that the shape of the supporting part 105z, the shape of the hole 102z, and the shape of the groove 103z can be arbitrarily determined as long as the above-described conditions are satisfied.

FIG. 23 illustrates a case where the groove 103z is connected to the hole 102z at the side surface 403 of the hole. However, the groove 103z needs not be connected to the hole 102z at the side surface 403 of the hole.

The structure of the fixing object 101z as described above provides the advantageous effects described in the [Advantageous Effects of Invention] section.

The whole or part of the example embodiments disclosed above can be described as, but not limited to, the following supplementary notes.

(Supplementary Note A1)

A fixing object, including:

a supporting part including a hole and a groove formed in proximity to the hole, wherein the groove has a one-way open part that is opened at a surface of the supporting part where one exit of the hole is present, and is not opened at a surface of the supporting part where another exit of the hole is present, and a distance of a farthest portion of the groove from a center of gravity of the hole, from the center of gravity, is longer than a distance of a side-surface portion of the hole from the center of gravity, the side-surface portion being closest to the groove and being not in contact with the groove.

(Supplementary Note A1.1)

The fixing object according to Supplementary note 1, wherein the groove and the hole are connected.

(Supplementary Note A1.2)

The fixing object according to Supplementary note A1.1, wherein the groove and the hole are integrally formed.

(Supplementary Note A1.3)

The fixing object according to Supplementary note 1, wherein the groove and the hole are not connected with each other.

(Supplementary Note A2)

The fixing object according to any one of Supplementary notes A1 to 1.3, wherein the groove is not opened at one of a surface of the supporting part where the one exit is present and a surface of the supporting part where the another exit is present.

(Supplementary Note A3)

The fixing object according to any one of Supplementary notes A1 to A2, wherein it is assumed that a convex portion included in a fixation item, being an object to which the fixing object is fixed, is inserted into the hole in such a way that a surface of the supporting part that is not opened at a one-way open part is in contact with the fixing object, and then, a deformed portion formed by deforming at least a part of the convex portion is formed in such a way as to be in contact with a surface of the supporting part that is opened at a one-way open part, thereby fixing the fixing object to the fixing object.

(Supplementary Note A4)

The fixing object according to any one of Supplementary notes A1 to A3, wherein it is assumed that a part of the deformed portion is formed within the groove.

(Supplementary Note A5)

The fixing object according to Supplementary note A4, wherein it is assumed that the part is in contact with a bottom surface of the groove.

(Supplementary Note A6)

The fixing object according to any one of Supplementary notes A2 to A5, wherein it is assumed that the deformed portion is formed by a step including a step of deforming a part of the convex portion by heat.

(Supplementary Note B1)

A fixation item including:

a fixing object including a supporting part including a hole and a groove formed in proximity to the hole, the groove being provided with a one-way open part that is opened at a surface of the supporting part where one exit of the hole is present and is not opened at a surface of the supporting part where another exit of the hole is present, wherein a distance of a farthest portion of the groove from the center of gravity, from a center of gravity of the hole, is longer than the distance of a side-surface portion of the hole, the side-surface portion being closest to the groove and being not in contact with the groove; and a fixation item including a convex portion inserted into the hole, and a deformed portion of the convex portion in contact with a surface opened at a one-way open part of the supporting part, the fixation item being in contact with a surface that is not opened at a one-way open part of the supporting part.

(Supplementary Note B2)

The fixation item according to Supplementary note B1, wherein the groove is not opened at one of a surface of the supporting part where the one exit is present and a surface of the supporting part where the another exit is present.

(Supplementary Note B3)

The fixation item according to Supplementary note B1 or B2, wherein a part of the deformed portion is formed within the groove.

(Supplementary Note B4)

The fixation item according to Supplementary note B3, wherein the part is in contact with a bottom surface of the groove.

(Supplementary Note B5)

The fixation item according to any one of Supplementary notes B1 to B4, wherein the deformed portion is formed by a step including a step of deforming a part of the convex portion by heat.

(Supplementary Note C1)

A fixing method including:

a step of inserting a convex portion included in a fixation item into a hole formed in a fixing object, the fixing object including a supporting part including the hole and a groove formed in proximity to the hole, the groove being provided with a one-way open part that is opened at a surface of the supporting part where one exit of the hole is present, and is not opened at a surface of the supporting part where another exit of the hole is present, wherein a distance of a farthest portion of the groove from a center of gravity of the hole, from a center of gravity of the hole, is longer than the distance of a side-surface portion of the hole, the side-surface portion being closest to the groove and being not in contact with the groove;

a step of causing a fixation item to be in contact with a surface of the supporting part that is not opened at a one-way open part; and a step of forming a deformed portion of the convex portion in contact with a surface of the supporting part that is opened at a one-way open part.

(Supplementary Note C2)

The fixing method according to Supplementary note C1, wherein the groove is not opened at one of a surface of the supporting part where the one exit is present and a surface of the supporting part where another exit is present.

(Supplementary Note C3)

The fixing method according to Supplementary note C1 or C2, wherein the step of forming the deformed portion includes a step of forming a part of the deformed portion within the groove.

(Supplementary Note C4)

The fixing method according to Supplementary note C3, wherein the step of forming the part within the groove includes a step of causing the part to be in contact with a bottom surface of the groove.

(Supplementary Note C5)

The fixing method according to any one of Supplementary notes C1 to C4, wherein the step of forming the deformed portion includes a step of deforming an end of the convex portion by heat.

(Supplementary Note D1)

An assessment method including:

making an assessment of a fixed state between a fixing object and a fixation item, based on a shadow of a deformed portion formed by illumination for observation in an object of observation, the object of observation including:

the fixing object including a supporting part including a hole and a groove formed in proximity to the hole, the groove being provided with a one-way open part that is opened at a surface of the supporting part where one exit of the hole is present and is not opened at a surface of the supporting part where another exit of the hole is present, wherein a distance of a farthest portion of the groove from a center of gravity of the hole, from a center of gravity of the hole, is longer than a distance of a side-surface portion of the hole from the center of gravity, the side-surface portion being closest to the groove and being not in contact with the groove; and the fixation item including a convex portion inserted into the hole, and the deformed portion of the convex portion in contact with a surface of the supporting part that is opened at a one-way open part, the fixation item being in contact with a surface of the supporting part that is not opened at a one-way open part.

(Supplementary Note D2)

The assessment method according to Supplementary note D1, wherein the assessment is made based on whether the shadow is present or not.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent applications No. 2015-222792 filed on Nov. 13, 2015, the disclosure of which is incorporated herein in its entirety by reference.

REFERENCE SIGNS LIST 101, 101*f*, 101*g*, 101*h*, 101*i*, 101*j*, 101*k*, 101*v*, 101*z* fixing object
102, 102*z* Hole
103, 103*a*, 103*b*, 103*c*, 103*d*, 103*e*, 103*f*, 103*g*, 103*h*, 103*i*, 103*j*, 103*z* Groove
104 Convex portion
105*a*, 105*b*, 105*f*, 105*g*, 105*h*, 105*i*, 105*w*, 105*z*, 306, 306*w* Supporting part
106*a*, 106*b* Deformed portion
107*a*, 107*b* Inside groove deformed portion
108*a*, 108*b*, 108*m*, 108*o*, 108*v*, 108*x*, 141*a*, 141*b* Arrow
109*a*, 109*b* Groove-side surface
110*a*, 110*b* Deformed portion end
111, 111*b* Inside groove
112 Member
113 Convex portion side surface
130 Groove bottom portion
131 Convex portion side surface
132, 132*b* Shadow
151, 151*v* Fixation item
161 Heater
171 Heat
181, 182, 184, 186, 187, 188, 188*z*, 189, 191*a*, 191*b*, 191*c*, 191*d*, 191*e*, 191*x*, 191*y* Line
195, 195*b* Point
200 Resin panel
201 Button hole
202 Welding boss
203 Welded boss
300 Button
302 Welding boss insertion hole
304 Horizontal groove
305 Vertical groove
307 Spring
351*a*, 351*b*, 405, 406 Exit
401, 402 Distance
403 Side surface
404 Portion
407, 408 Surface

What is claimed is:

1. A fixing method including:
   inserting a convex portion included in a fixation item into a hole that is round and that is formed in a fixing object, the fixing object including a supporter including the hole and a groove formed at an edge of the hole and radially extending from the hole, the groove located at a first surface of the supporter where one exit of the hole is present, the first surface opposite a second surface of the supporter where another exit of the hole is present, wherein a distance of a farthest portion of the groove from a center of the hole, is longer than the distance of a side-surface portion of the hole from the center, the side-surface portion being closest to the groove and being not in contact with the groove;

causing the fixation item to be in contact with the second surface of the supporter; and forming a deformed portion of the convex portion in contact with the first surface of the supporter and covering an edge of the groove, by softening the convex portion after the inserting, wherein the farthest portion is not covered by the deformed portion.

2. The fixing method according to claim 1, wherein the forming the deformed portion includes forming a part of the deformed portion within the groove.

3. The fixing method according to claim 2, wherein the forming the part within the groove includes causing the part to be in contact with a bottom surface of the groove.

4. The fixing method according to claim 1, wherein the forming the deformed portion includes deforming an end of the convex portion by heat.

* * * * *